(12) United States Patent
Zhang et al.

(10) Patent No.: US 12,461,001 B2
(45) Date of Patent: Nov. 4, 2025

(54) ELECTRIC-HYDRAULIC BRINELL HARDNESS TESTING HEAD AND PORTABLE ELECTRIC-HYDRAULIC BRINELL HARDNESS TESTER

(71) Applicant: Shenyang Tianxing Testing Instruments Co., Ltd., Shenyang (CN)

(72) Inventors: Luming Zhang, Shenyang (CN); Xuwei Sun, Shenyang (CN); Xiao Hou, Shenyang (CN)

(73) Assignee: SHENYANG TIANXING TESTING INSTRUMENTS CO., LTD., Shenyang (CN)

( * ) Notice: Subject to any disclaimer, the term of this patent is extended or adjusted under 35 U.S.C. 154(b) by 87 days.

(21) Appl. No.: 18/551,142

(22) PCT Filed: Jan. 26, 2022

(86) PCT No.: PCT/CN2022/073998
§ 371 (c)(1),
(2) Date: Sep. 18, 2023

(87) PCT Pub. No.: WO2023/065567
PCT Pub. Date: Apr. 27, 2023

(65) Prior Publication Data
US 2024/0159636 A1  May 16, 2024

(30) Foreign Application Priority Data
Oct. 23, 2021 (CN) .......................... 202111236695.X

(51) Int. Cl.
*G01N 3/42* (2006.01)
*G01N 3/02* (2006.01)

(52) U.S. Cl.
CPC ....... *G01N 3/42* (2013.01); *G01N 2203/0048* (2013.01); *G01N 2203/0076* (2013.01);
(Continued)

(58) Field of Classification Search
CPC .. G01N 3/42; G01N 3/40; G01N 3/06; G01N 3/44; G01N 3/46; G01N 3/08; G01N 3/10;
(Continued)

(56) References Cited

U.S. PATENT DOCUMENTS 2,297,758 A   10/1942  Fitch
3,129,582 A   4/1964   Borgersen
(Continued)

FOREIGN PATENT DOCUMENTS

CN   101660988 B   6/2011
CN   202471531 U   10/2012
(Continued)

*Primary Examiner* — Brandi N Hopkins
(74) *Attorney, Agent, or Firm* — MUNCY, GEISSLER, OLDS & LOWE, P.C.

(57) ABSTRACT

An electric-hydraulic Brinell hardness testing head and a portable electric-hydraulic Brinell hardness tester. A controller, a battery pack and a motor are mounted on a hydraulic integrated block, an electric plunger pump is mounted in the hydraulic integrated block, and a check valve is mounted in a cartridge valve seat, which are advantageous in that by controlling the motor-driven miniature electric plunger pump with the controller to realize durable force applying, stability and accuracy of test force within retention time are realized, so that the test principle, the test force accuracy, an indication error, and a repeatability error of hardness measurement results comply with relevant domestic and foreign standards; and have the characteristics of simple measurement operations, quick measurement process, high efficiency, accurate test results, and high reliability, thereby ensuring the basic requirements for miniaturization, lightweight, and on-site use of portable hardness testers.

12 Claims, 17 Drawing Sheets

(52) U.S. Cl.
CPC ............... *G01N 2203/0098* (2013.01); *G01N 2203/0274* (2013.01)

(58) Field of Classification Search
CPC .. G01N 3/02; G01N 3/56; F04B 17/03; F04B 53/14; F04B 51/00; F04B 53/00; F04B 9/02; F04B 1/0404; E21B 19/084; E21B 3/02; E21B 17/1078; G01M 13/00; G01M 13/04; G01M 99/005; G01M 3/3281; G01M 13/02; B23P 19/027; F15B 11/055; F15B 19/007; F15B 21/08; F15B 15/14; F15B 20/002; H01R 43/0427; G01L 5/0009; G01L 3/20; B30B 15/16; B30B 1/32; F16H 2007/0806; E02D 1/00; G01R 31/003; F16N 37/00; B06B 1/183
See application file for complete search history.

(56) References Cited

U.S. PATENT DOCUMENTS

| | | |
|---|---|---|
| 4,361,034 A | 11/1982 | Borgersen et al. |
| 2015/0362416 A1 | 12/2015 | Biddle |
| 2016/0245734 A1 | 8/2016 | Mazzoleni |
| 2017/0074765 A1 * | 3/2017 | Koshimizu ............... G01N 3/42 |

FOREIGN PATENT DOCUMENTS

| | | | |
|---|---|---|---|
| CN | 103765188 A | 4/2014 | |
| CN | 206161456 U | 5/2017 | |
| CN | 209215141 U | 8/2019 | |
| CN | 110411846 A | 11/2019 | |
| CN | 113866036 A | 12/2021 | |
| DE | 102018210688 A1 * | 1/2020 | ............... G01N 3/42 |
| DE | 102019126612 A1 * | 4/2020 | ............... G01N 3/42 |
| JP | 2000298090 A | 10/2000 | |

* cited by examiner

ELECTRIC-HYDRAULIC BRINELL HARDNESS TESTING HEAD AND PORTABLE ELECTRIC-HYDRAULIC BRINELL HARDNESS TESTER

BACKGROUND OF THE INVENTION

1. Field of the Invention

The present invention relates to the technical field of metal hardness testers, and particularly relates to an electric-hydraulic Brinell hardness testing head and a portable electric-hydraulic Brinell hardness tester using a Brinell hardness test method.

2. The Prior Arts

The national standard GB/T 231.1 "Metallic Materials-Brinell Hardness Test-Part 1: Test Method" specifies the principle of Brinell hardness tests: apply specified test force to a tungsten carbide alloy ball with a certain diameter to press it into the surface of a sample; and after the specified retention time, remove the test force, measure the indentation diameter on the surface of the sample, and obtain the Brinell hardness value through calculation or lookup table. This standard also specifies that the retention time of the test force is 10-15 s.

The national standard GB/T 231.2 "Metallic Materials-Brinell Hardness Test-Part 2: Verification and Calibration of Hardness Tester" specifies the technical requirements for the Brinell hardness tester, specifies that the allowable error of the test force is ±1.0% of nominal value, and also specifies an indication error and a repeatability error representing the measurement accuracy of the hardness tester.

The US standard ASTM E10 "Test Method for Brinell Hardness of Metallic Materials" also has provisions similar to GB/T 231.1 and GB/T 231.2.

According to the provisions of domestic and foreign standards, three basic elements of Brinell hardness tests are accurate specified test force, retention of the test force for specified time, and the use of a specified ball. In addition, domestic and foreign standards also specify the test force accuracy and Brinell hardness measurement accuracy of the Brinell hardness tester.

The invention patent publication number CN103765188A discloses a "Portable Brinell metal hardness tester". Through reading the description of this invention, it can be seen that the invention is aimed at solving the problem in the portable Brinell metal hardness testers disclosed in U.S. Pat. Nos. 3,129,582 and 4,361,034 and claimed for patent protection: leaking of hydraulic fluid during the calibration and oil replacement treatment; the risk of contamination of hydraulic fluid; and unintentionally or sometimes intentionally pulling a pump handle beyond the designed angle stroke range of the tester by technical personnel during testing due to excessive operational behaviors in the process of manually operating an oil pump for force applying, resulting in either breaking of the pump handle or damage to an internal gear of the oil pump inside the tester, rendering the tester unusable until it is repaired. This invention adopted a technical solution of comprising a testing head which is mounted on a cradle and can move vertically along a lifting screw rod. The Brinell metal hardness tester comprises an adjustable valve for releasing liquid pressure inside the testing head. However, in this invention, a manual pump is still used to apply force, that is, a manual plunger pump is mounted on the side surface of the hydraulic integrated block, and the operator drives the plunger pump to work through gear and rack transmission by pulling the pump handle. In addition, a force indicator is mounted on the hydraulic integrated block, and the operator needs to repeatedly pull the pump handle until test force value indicated by the indicator reaches a set value. It is needed to further pull the pump handle multiple times, so that the test force value indicated by the indicator reaches the set value multiple times, and then one-time measurement can be completed. The prior art cited in this invention is U.S. Pat. No. 3,129,582 in 1964 and U.S. Pat. No. 4,361,034 in 1982, along with an earlier prior art of U.S. Pat. No. 2,297,758 in 1942. This earlier US patent pioneered the use of the portable hardness tester to conduct Brinell hardness tests with large test force on the production site, which changed the situation that large workpieces being large, difficult to move had to be cut into samples and sent to the laboratory for inspection in the past. This technology is an important technological progress at that moment. Therefore, the portable Brinell hardness tester manufactured based on this technology has been adopted as the preferred portable Brinell hardness tester by the US standard ASTM E110. For decades, this type of hardness tester has been widely welcomed worldwide. When testing the hardness of casting, forging, steel, and non-ferrous metal heat treated elements, such portable Brinell hardness tester, which uses hydraulic principles to apply test force, has been widely used and has become a mainstream product. This technology has been invented for nearly 80 years, despite many improvements were made during this period, there have been no significant changes in its principle and structure, and manual plunger pumps are still used for manual force applying. This technology has the following three obvious shortcomings and defects. Firstly, this invention does not comply with the Brinell hardness test principle specified in the national standard GB/T 231.1 and the US standard ASTM E10, and it does not comply with the provisions of the above standards in the retention time of the test force. The reason is that when the test force reaches the set value, the adjustable valve will be opened and the test force will no longer increases. But, under the action of the test force, a ball indenter will be pressed into the surface of the sample, thereby generating indentations. At this time, the ball indenter will move downward, and the pressure of the oil cylinder will also decrease. When the test force is just below the set value, the adjustable valve will be closed. As the ball indenter continues to be pressed into the surface of the sample, the test force will further decrease until the operator pulls the pump handle again to apply the test force. When the test force exceeds the set value again, the adjustable valve will be opened again, and the test force will no longer increase. According to the provisions of the US standard ASTM E110-82 (1997), it is impossible to retain the test force at the value when the adjustable valve is just opened under the using this hydraulic device. Therefore, the test force should repeatedly reach this value several times. For steel materials, when 3000 kg test force is adopted, the test force should repeatedly reach the set value three times, for being equivalent to the effect of retaining the test force for 15 s in the standard method. It can be seen that when Brinell hardness test is performed with reference to this invention, the test force cannot be retained, which does not comply with the Brinell hardness test principles and the provisions in the retention time of the test force specified in the national standard GB/T 231.1 and the US standard ASTM E10. Especially, units that have passed the ISO9001 quality system certification are required that their metering and detecting equipment should comply with corresponding national standards and obtain corresponding verification or calibration certificate through metrological verification or calibration. The portable hydraulic Brinell hardness tester with reference to the prior art does not comply with the corresponding standards, cannot pass metrological verification or calibration, and cannot obtain the corresponding verification or calibration certificate. Therefore, it does not comply with the requirements of the ISO9001 quality system. Secondly, when the Brinell hardness test is performed with reference to this invention, the test force fluctuates greatly, which does not comply with the provisions in the accuracy of test force in the national standard GB/T 231.2 and the US standard ASTM E10, wherein the Brinell hardness measurement accuracy cannot meet the requirements for the indication error and the repeatability error in the standards GB/T 231.2 and ASTM E10, and there will be a large deviation from the measurement results of the Brinell hardness tester adopting the standard Brinell hardness test method. Thirdly, the Brinell hardness test performed with reference to this invention is troublesome to operate and requires repeatedly pulling of a force applying rod, namely the pump handle, to make the pointer of a force value meter reach the set value three times. This measurement operation is labor-consuming and time-consuming, requiring significant physical demands of the operators, and has low detection efficiency. In addition, in order to solve the problem of fracture of the combination of gear and rack of the hydraulic pump of the tester caused by excessive use of the tester due to unintentionally applying excessive force to the pump handle because of excessive operations or operators being insufficiently trained, in this invention, a stopper is connected to the cradle to limit the angular movement of a rotary shaft rotated by the pump handle. Once the operators learn to operate the portable Brinell metal hardness tester correctly, stopping structure components can be removed. It can be seen that there is still a hidden risk of fracture of the combination of gear and rack of the hydraulic pump of the tester in this invention.

The utility model patent publication number CN209215141U discloses a novel portable electronic Brinell hardness tester, which is provided with a hydraulic cylinder, an electromagnetic valve arranged at the top of the hydraulic cylinder, a weighing sensor arranged at the bottom of the hydraulic cylinder and arranged between a hydraulic mechanism and an indenter. When the hydraulic mechanism generates pressure, the weighing sensor obtains a corresponding force value signal, and is connected with an electromagnetic valve for signal transmission. When the force value exceeds upper-limit of tolerance, the electromagnetic valve releases pressure to reduce the force value, and when the force value reduces to the lower-limit tolerance, the operator operates a hydraulic force applying handle to increase the pressure for increasing the force value, thereby retaining the force value within the set upper and lower limits of the force value. The technology disclosed in the said published utility model patent has not made significant progress compared to the prior art, the function of the electromagnetic valve is not greater than that of an adjustable valve in the prior art, and their functions are both to open the valve when the test force reaches the set value to release excessive liquid, such that that the test force no longer increases. The use of this technology cannot avoid a decrease in the test force caused by the continuous pressing of the ball indenter into the surface of the sample. Moreover, this technology can neither retain the test force, nor ensure the accuracy of the test force, which does not comply with the provisions of national standards GB/T 231.1 and GB/T 231.2. Similarly, compared with the prior art, it does not simplify measurement operations, save labor, save time, or improve detection efficiency. In particular, for this published utility model patent, the operator needs to apply the test force through the collaborative action of the electromagnetic valve and the hydraulic force applying handle, requiring skillful operations of the operator, which not only increases the difficulty of operation but also cause it to be more complicated, and inaccurate results is prone to be obtained due to misoperation.

The invention patent publication number CN101660988B discloses a portable on-site Brinell hardness tester. A hydraulic force applying device of this invention uses a jack which is fixed on a lifting device and moves up and down with the lifting device. A displacement sensor is located above a pressing lever of the force applying device for measuring displacement, and a pressure sensor is located below a top pressing lever of the force applying device for measuring pressure. A method of converting indentation depth into Brinell hardness value replaces a method of measuring the diameter of indentation to calculate Brinell hardness value in the prior art. This invention obviously has the following three problems. Firstly, this invention neither conform to the Brinell hardness test principle specified in the national standard GB/T 231.1, nor take any other standards as a basis, its measurement results cannot be compared with the results of the Brinell hardness tester using the standard Brinell hardness test method, and its measurement results are not worth being referred. Secondly, the jack cannot provide the stable and accurate test force required for the hardness tester, and therefore, the use of the jack cannot produce a usevaluable hardness tester. Thirdly, the utility model patent application uses the bulky jack and a force applying device using lever system to replace the hydraulic force applying device in the prior art, which not only fails to meet the required test force accuracy, but also significantly increases the weight of the hardness tester.

The prior arts represented by the previous two reference documents both have defects that accurate test force cannot be provided and the accurate test force cannot be retained for the specified time, which do not comply with the provisions of the corresponding domestic and foreign standards. Compared with the results of the Brinell hardness tester using the standard Brinell hardness test method, the test results have larger errors. In addition, there are also defects of troublesome operation, time-consuming, labor-consuming, and low detection efficiency. The technology disclosed in the third reference document does not take any standard as basis, its measurement results cannot be compared with the results of the Brinell hardness tester using the standard Brinell hardness test method, and its measurement results are not worth being referred.

SUMMARY OF THE INVENTION

The technical problem to be solved by the present invention is to overcome the shortcomings and defects of the prior art, and improve and innovate the prior art. The present invention provides an electric-hydraulic Brinell hardness testing head and a portable electric-hydraulic Brinell hardness tester which fully comply with the provisions of the standards GB/T 231.1, GB/T 231.2, and ASTM E10. The present invention aims to achieve the following purposes:

Firstly, in the electric-hydraulic Brinell hardness testing head, the structure of a motor-driven miniature electric plunger pump capable of performing automatic force applying is used for replacing the structure of a manual pump which needs manual force applying in the prior art, to achieve stable and accurate test force applying and retain the test force for specified time.

Secondly, the electric-hydraulic Brinell hardness testing head should have the function of applying and retaining the test force by pressing a measurement key once, making the measurement operation simple.

Thirdly, by using rechargeable battery packs to charge an electronic system, portability and on-site use can be achieved.

Fourthly, compared with the prior art, the improved electric-hydraulic Brinell hardness testing head should not have a significant increase in volume and weight after additionally providing with a controller, a pressure sensor, a motor, a miniature electric plunger pump, a battery pack, a cartridge valve seat, a filter, and a motor electrical cover, in order to ensure the basic characteristics of miniaturization and lightweight of the portable hardness tester.

Fifthly, it is intended to allow the test force accuracy, as well as the indication error and the repeatability error of the measurement results of the portable electric-hydraulic Brinell hardness tester using the electric-hydraulic Brinell hardness testing head to comply with the provisions of standards GB/T 231.2 and ASTM E10.

Sixthly, it is intended to allow the portable electric-hydraulic Brinell hardness tester using the electric-hydraulic Brinell hardness testing head to be easy to operate, time-saving, labor-saving and highly efficient.

An electric-hydraulic Brinell hardness testing head of the present invention adopts a technical solution of comprising a check valve, a pressure regulating valve, an oil drain valve, an oil cylinder, a ball indenter, and a hydraulic integrated block, wherein a controller, a battery pack, and a motor are mounted on the hydraulic integrated block; the controller is electrically connected with the motor and the battery pack, respectively; an electric plunger pump body mounting hole and a check valve mounting hole are formed on the hydraulic integrated block, an electric plunger pump is mounted in the electric plunger pump body mounting hole, a cartridge valve seat is mounted in the check valve mounting hole, the check valve is mounted in the cartridge valve seat, one end of the electric plunger pump communicates with a low-pressure cavity, another end of the electric plunger pump communicates with a high-pressure cavity through the check valve, and the motor is also connected with the electric plunger pump.

A first horizontal oil passage, a second horizontal oil passage, a third horizontal oil passage, a fourth horizontal oil passage, a fifth horizontal oil passage, a sixth horizontal oil passage, a seventh horizontal oil passage, a first vertical oil passage, a second vertical oil passage, a third vertical oil passage, a fourth vertical oil passage, a first inclined oil passage, a second inclined oil passage and a third inclined oil passage are also arranged in the hydraulic integrated block, wherein an oil outlet is formed at a bottom of the electric plunger pump body mounting hole, an L-shaped oil passage is arranged in the cartridge valve seat, two ends of the L-shaped oil passage respectively communicate with the oil outlet and the check valve, one end of the first horizontal oil passage communicates with the check valve, another end of the first horizontal oil passage communicates with the second horizontal oil passage, the second horizontal oil passage communicates with the third vertical oil passage, the third vertical oil passage communicates with the high-pressure cavity through the first inclined oil passage, the low-pressure cavity communicates with one end of the seventh horizontal oil passage, another end of the seventh horizontal oil passage communicates with the fourth horizontal oil passage, the fourth horizontal oil passage communicates with the fifth horizontal oil passage, and another end of the fifth horizontal oil passage communicates with an oil inlet cavity.

A rear protrusion is arranged at the rear part of the hydraulic integrated block, mounting bosses are arranged on the left side and the right side of the upper part of the rear protrusion, a motor bracket and a motor electrical cover are mounted on the mounting bosses, and the motor is mounted at the upper end of the motor bracket; and the controller and the battery pack are mounted on the motor electrical cover, a lower protrusion is arranged at the lower part of the rear protrusion of the hydraulic integrated block, the check valve mounting hole is formed on the rear side of the lower protrusion, and the electric plunger pump body mounting hole is formed on the rear protrusion of the hydraulic integrated block.

A valve ball is mounted at the lower end of the pressure regulating valve; the second vertical oil passage communicates with an oil drain hole, the lower end of the second vertical oil passage communicates with the second horizontal oil passage and is parallel to the first vertical oil passage, the second horizontal oil passage respectively communicates with the third vertical oil passage and the first horizontal oil passage, an oil storage cup is mounted in the oil cylinder, the diameter of the lower part of the oil storage cup is smaller than the inner diameter of a circular groove of the oil cylinder, the oil storage cup extends downwards into the circular groove of the oil cylinder, the high-pressure cavity is formed to be closed among the inner surface of the oil cylinder mounting hole, the upper end surface of the oil cylinder, the inner surface of the circular groove and the outer surface of the lower part of the oil storage cup; and a cup-shaped oil bag is mounted in the oil storage cup, the low-pressure cavity is formed to be closed between the cup-shaped outer surface of the oil bag and the circular groove of the oil storage cup, and the seventh horizontal oil passage is arranged at the inner diameter of the annular boss of the oil storage cup.

A filter mounting hole is also formed on the hydraulic integrated block, a filter is mounted in the filter mounting hole, the filter comprises a filter valve body, a radially penetrating rectangular valve core hole and a filter hole that intersects vertically with the valve core hole are arranged on the filter valve body, openings at two ends of the filter hole are located in the fifth horizontal oil passage, a sheet-shaped filter element is mounted in the rectangular valve core hole, a positioning shaft being a cylindrical protrusion is arranged at the lower end surface of the filter valve body, a positioning hole matching with a positioning shaft is formed on the bottom surface of the filter mounting hole, an exhaust plane being parallel to a central axis is arranged at the lower part of a cylinder of the filter valve body, and an exhaust notch is formed between the exhaust plane and the filter hole.

The pressure regulating valve comprises a pressure regulating screw rod, a pressure regulating spring and a stepped ejector pin, wherein the pressure regulating screw rod is in threaded connection with the pressure regulating hole, the pressure regulating spring is mounted below the pressure regulating screw rod, the stepped ejector pin is mounted below the pressure regulating spring, one end of the stepped ejector pin penetrates through the pressure regulating spring to be in contact with a groove at the lower end of the pressure regulating screw rod, the upper end surface of another end of the stepped ejector pin is in contact with the lower end of the pressure regulating spring, the bottom surface of the other end of the stepped ejector pin is in contact with the valve ball, the lower spherical surface of the valve ball is tightly attached to the annular edge of the upper end of the first vertical oil passage, a pressure regulating screw plug is connected to the upper end of the external thread of the pressure regulating screw rod, the upper end surface of the pressure regulating screw rod is higher than the upper end surface of the pressure regulating screw plug, and a boss is arranged on the upper end surface of the pressure regulating screw rod.

The oil drain valve comprises an oil drain screw rod, wherein the upper part of the oil drain screw rod is a sheet-shaped wrench, the lower part of the oil drain screw rod is a cylinder, an oil drain nut and an oil drain sealing ring sleeve the oil drain screw rod, the bottom surface of the oil drain screw rod is in point contact with the convex spherical surface of the upper end of the oil drain ejector pin, the lower end of the oil drain ejector pin with a smaller diameter is a cone, the conical surface of the cone is tightly attached to the annular edge of the upper end of the second vertical oil passage, and an oil drain cavity is formed in a gap between the oil drain ejector pin and the oil drain hole; the third horizontal oil passage enables the oil drain cavity to communicate with the pressure regulating low-pressure cavity; the middle of the sixth horizontal oil passage communicates with the oil drain cavity; a first plug is mounted at one end of the sixth horizontal oil passage, and another end of the sixth horizontal oil passage communicates with the fourth vertical oil passage; a second plug is mounted at the upper end of the fourth vertical oil passage, the lower end of the fourth vertical oil passage communicates with the upper end of the second inclined oil passage, the lower end of the second inclined oil passage communicates with an annular oil cylinder lubricating groove in the oil cylinder mounting hole, and the lower end of the third inclined oil passage communicates with the fourth vertical oil passage; and a horizontal oil return passage is also arranged at the inner diameter of the annular boss on the oil storage cup, the upper end of the third inclined oil passage communicates with the oil return passage, and another end of the oil return passage communicates with the low-pressure cavity.

A portable electric-hydraulic Brinell hardness tester comprises a lifting bracket, wherein the lifting bracket comprises a base, two parallel lifting screw rods are fixedly mounted on the base, a handle is mounted at the upper ends of the lifting screw rods, a frame capable of moving vertically is also mounted on the lifting screw rods, a lifting crank handle is arranged on the frame, and the electric-hydraulic Brinell hardness testing head is mounted at the left end of the frame.

The portable electric-hydraulic Brinell hardness tester comprises a chain bracket, wherein the chain bracket comprises a bracket body, a handwheel is mounted at the upper end of the bracket body, the lower end of the handwheel is in threaded connection with the nut mounted on a lifting connecting plate through a handwheel screw rod, hooks are connected to two sides of the lifting connecting plate, chains are connected to the hooks, support legs are mounted at the lower end of the bracket body, and the above-mentioned electric-hydraulic Brinell hardness testing head is mounted at the lower part of the bracket body.

The portable electric-hydraulic Brinell hardness tester comprises a left connecting plate and a right connecting plate, wherein a left magnetic sucking disc is connected to the left connecting plate, a right magnetic sucking disc is connected to the right connecting plate, a left magnetic switch handle is mounted on the left side of the left magnetic sucking disc, a right magnetic switch handle is mounted on the right side of the right magnetic sucking disc, the lower surfaces of the left magnetic sucking disc and the right magnetic sucking disc are magnetic sucking surfaces, the left magnetic sucking disc and the right magnetic sucking disc are located on the same plane, and the above-mentioned electric-hydraulic Brinell hardness testing head is mounted between the left connecting plate and the right connecting plate.

1. The present invention overcomes the defects of a portable hydraulic Brinell hardness tester in the prior art which have not been solved for a long time that a test method and the retention time of the test force do not conform to the corresponding domestic and international standards. The present invention conforms to the corresponding domestic and foreign standards. The portable Brinell metal hardness tester in the prior art was invented nearly 80 years ago, despite many improvements were made during this period, no significant changes have occurred in the principle and the structure, a manual plunger pump is still used to manually apply force, and the test method and the retention time of the test force do not conform to the corresponding domestic and foreign standards. The present invention overcomes the defects in the prior art, the structure of a motor-driven miniature electric plunger pump capable of performing automatic force applying is used for replacing the structure of a manual plunger pump which needs manual force applying in the prior art, and a controller is used for controlling the motor-driven miniature electric plunger pump to realize continuous force applying, so as to realize stability and accuracy of the test force within the retention time, and the present invention complies with domestic and foreign standards in the principle of Brinell hardness tests and the retention time of the test force.

2. The present invention overcomes the defects that in the prior art, the manual pump is used for force applying, so that the test force is incorrect, measurement accuracy is different from that of the Brinell hardness tester by the standard Brinell hardness test method, and an indication error and a repeatability error of hardness measurement results cannot meet the requirements of domestic and foreign standards; the controller is used for controlling the motor-driven miniature electric plunger pump to realize continuous force applying, and then the controller and a pressure sensor are used to achieve the closed-loop control of the test force, so that the accuracy of the test force and the indication error and the repeatability error of the hardness measurement results meet the requirements of the standards GB/T 231.2 and ASTM E10, and the test results are accurate.

3. The present invention overcomes the defects which exist for a long term that in the prior art, it is needed to repeatedly pull a pump handle many times, so that the pointer of a force value meter reaches a position of set value three times, and the measurement operation is complicated, time-consuming, and low-efficiency. Applying and retention operations of the test force can be completed by pressing a measurement key once, which has the characteristics of simple operation, quick measurement process, high efficiency, accurate measurement results, and high reliability, and ensures basic requirements for miniaturization, light-weight, and on-site use of the portable hardness tester.

4. Compared with the prior art, the electric-hydraulic Brinell hardness testing head of the present invention realizes electromechanical integration, under the conditions that volume and weight are restricted, outstanding substantive improvements have been made to the hydraulic integrated block, the improved hydraulic integrated block has reduced volume and the reduced weight, the volume is 108 mm×69 mm×87 mm, and the weight is 1850 g. Compared with the prior art, despite the addition of a motor, the electric plunger pump, the battery pack, as well as a pressure sensor, a cartridge valve seat, a filter valve, a controller, a motor electrical cover, and other components, at the same time, a heavier indicator and a heavier indicator lifting beam in the prior art are moved, by means of advancement of a high-capacity lithium battery technology and a miniature electric plunger pump technology, the volume and the weight of the electric-hydraulic Brinell hardness testing head of the present invention are not increased, the measurement results of the weight of the sample shows that the total weight of the electric-hydraulic Brinell hardness testing head is 4080 g, which is lower than that of a hydraulic Brinell hardness testing head in the prior art, and basic requirements for miniaturization, lightweight, and on-site use of the portable hardness tester are ensured.

5. A rechargeable battery pack is used to charge electronic systems, so that the portability and on-site use of the electric-hydraulic Brinell hardness testing head and the portable hardness tester can be ensured.

6. A miniature electric plunger pump for force applying is adopted in the present invention, wherein gears and racks for a manual plunger pump in the prior art do not exist, so that the problem of damage of the gears and the racks does not exist, and the reliability is high.

DETAILED DESCRIPTION OF THE PREFERRED EMBODIMENT

Embodiment 1

Figure 1:
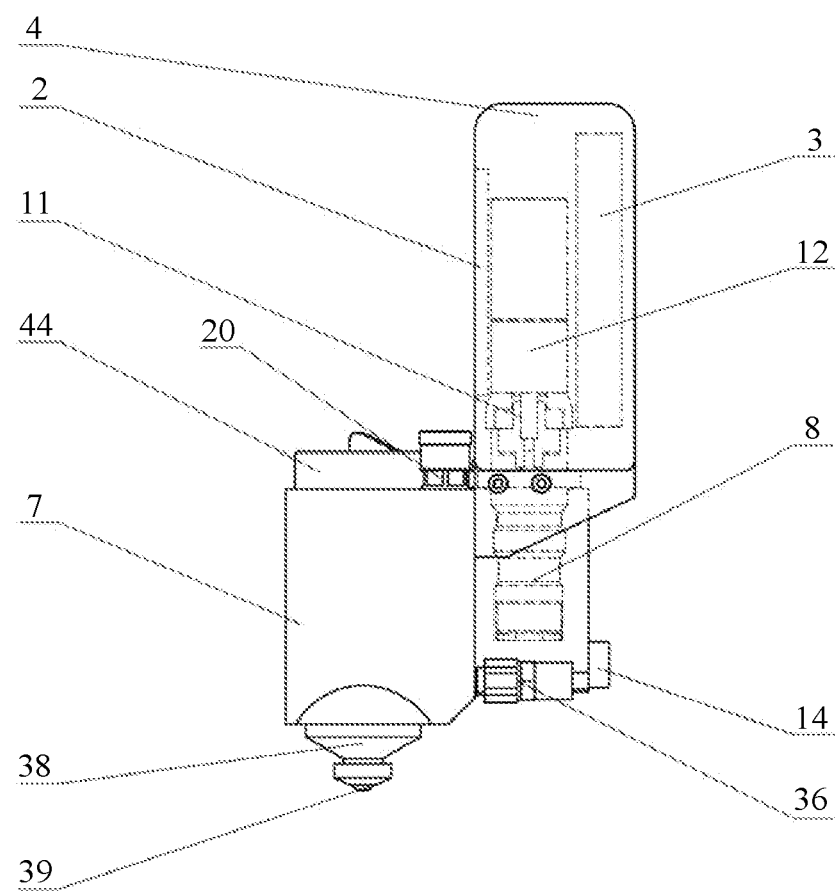
FIG. 1 is a right view of the present invention.

As shown in FIGS. 1-13, an electric-hydraulic Brinell hardness testing head of the present invention adopts a technical solution of comprising an electric plunger pump 8, an oil cylinder 38, a ball indenter 39 and a hydraulic integrated block 7, wherein the hydraulic integrated block 7 comprises a front part and a rear part. A rear protrusion 7-6 is arranged at the rear part of the hydraulic integrated block 7. Mounting bosses 7-7 are arranged on the left side and the right side of the upper part of the rear protrusion 7-6. A motor bracket 13 and a motor electrical cover 4 are mounted on the mounting bosses 7-7 through the connecting screw 7-9, and a motor 12 is mounted at the upper end of the motor bracket 13. The motor electrical cover 4 comprises a front part and a rear part, a controller 2 is mounted at the front part of the motor electrical cover 4, a battery pack 3 is mounted at the rear part of the motor electrical cover 4. A pump body mounting hole 7-1 is formed in the central position of the upper surface of the rear protrusion 7-6 of the hydraulic integrated block 7. A lower protrusion 7-8 is arranged at the lower part of the rear protrusion 7-6 of the hydraulic integrated block 7, and a check valve mounting hole 7-5 is arranged in the central position of the rear side surface of the lower protrusion 7-8. A pressure regulating hole 7-3, an oil drain hole 7-4 and a filter mounting hole 49 are formed on the upper surface of the front part of the hydraulic integrated block 7. A pressure sensor mounting hole 35 is formed at the left lower corner of the rear side of the front part of the hydraulic integrated block 7, and an oil cylinder mounting hole 37 is formed on the upper surface of the front part of the hydraulic integrated block 7. A first horizontal oil passage 16, a second horizontal oil passage 17, a third horizontal oil passage 33, a fourth horizontal oil passage 46, a fifth horizontal oil passage 47, a sixth horizontal oil passage 59, a seventh horizontal oil passage, 40-1, a first vertical oil passage 19, a second vertical oil passage 28, a third vertical oil passage 34, a fourth vertical oil passage 61, a first inclined oil passage 42, a second inclined oil passage 63 and a third inclined oil passage 65 are also arranged in the hydraulic integrated block 7.

Figure 5:
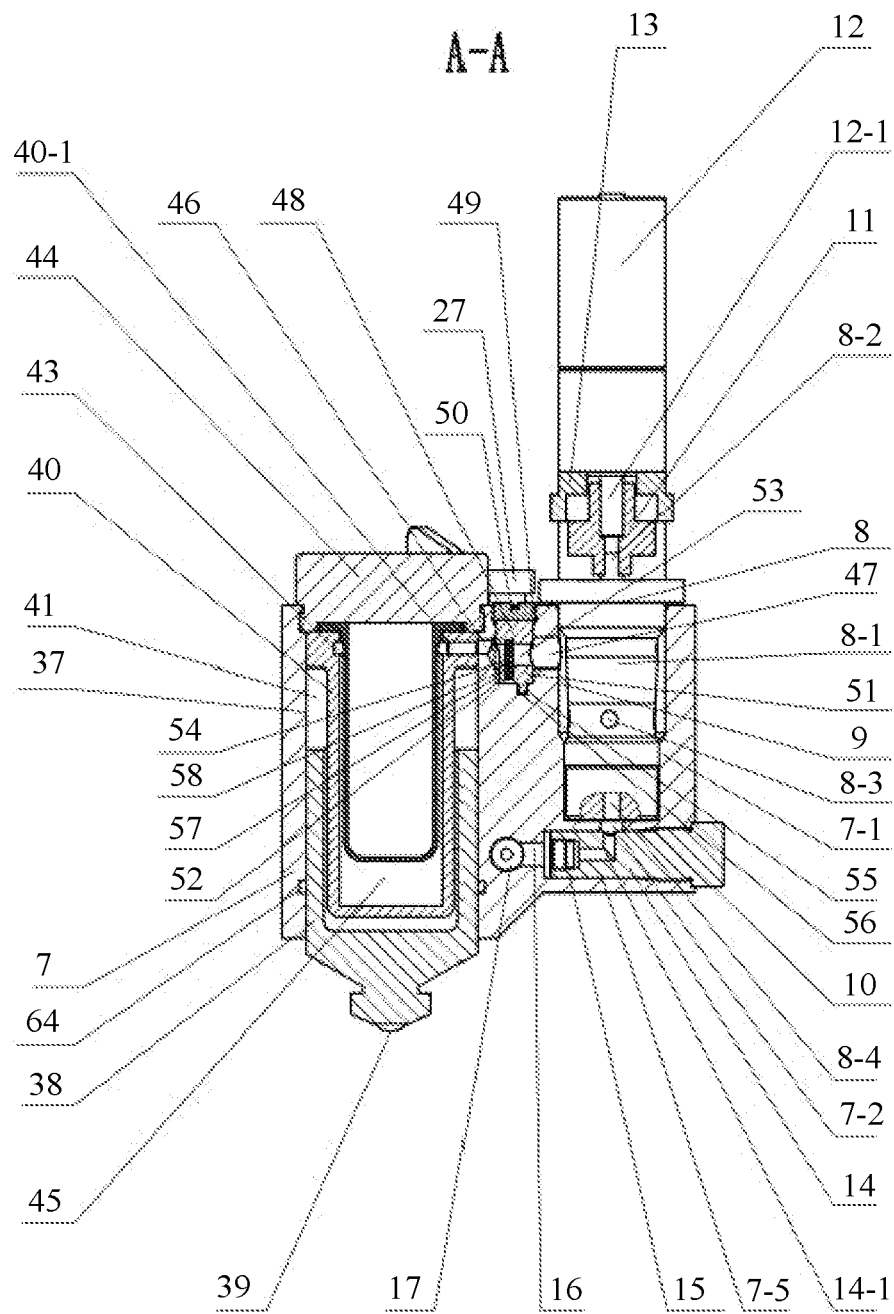
FIG. 5 is an enlarged cross-sectional view taken along line A-A of FIG. 4.

Mainly, referring to FIG. 5, a pump body 8-1 of the electric plunger pump 8 is mounted in the pump body mounting hole 7-1. An electric plunger pump oil inlet 8-3 is located on the outer wall of the pump body 8-1. An electric plunger pump oil outlet 8-4 is located in the bottom center of the pump body 8-1. An oil inlet cavity 9 is formed between the inner wall of the pump body mounting hole 7-1 and the electric plunger pump oil inlet 8-3. An oil outlet 7-2 is formed at the bottom of the pump body mounting hole 7-1. An oil outlet cavity 10 is formed between the oil outlet 7-2 and the electric plunger pump oil outlet 8-4. The oil inlet cavity 9 and the oil outlet cavity 10 are separated from each other, and a motor shaft 12-1 of the motor 12 is connected with a pump shaft 8-2 of the electric plunger pump 8 through a shaft coupler 11, so that the motor shaft 12-1 of the motor 12 can rotate to drive the pump shaft 8-2 of the electric plunger pump 8 to rotate through the shaft coupler 11, hydraulic oil in the oil inlet cavity 9 enters the electric plunger pump oil inlet 8-3, and the hydraulic oil is pressurized by the electric plunger pump 8 to be drained into the oil outlet cavity 10 from the electric plunger pump oil outlet 8-4.

Mainly, referring to FIG. 5, in order to accurately mount a check valve between the electric plunger pump oil outlet 7-2 and the first horizontal oil passage 16, a cartridge valve seat 14 is in threaded connection to the inner part of the check valve mounting hole 7-5. A check valve 15 is mounted in the cartridge valve seat 14. An L-shaped oil passage 14-1 is arranged in the cartridge valve seat 14, two ends of the L-shaped oil passage 14-1 respectively communicate with the oil outlet 7-2 and the check valve 15. The hydraulic oil is drained out from the oil outlet 7-2 after being pressurized to enter the check valve 15 through the L-shaped oil passage 14-1. When the electric plunger pump 8 operates, the check valve 15 is opened, and the hydraulic oil enters the first horizontal oil passage 16 from the check valve 15; one end of the first horizontal oil passage 16 communicates with the check valve 15, another end of the first horizontal oil passage 16 communicates with the second horizontal oil passage 17, the hydraulic oil enters the second horizontal oil passage 17 through the first horizontal oil passage 16. When the hydraulic oil stops flowing, the check valve 15 is closed to prevent the hydraulic oil from reversely entering the L-shaped oil passage 14-1 from the first horizontal oil passage 16.

Figure 6:
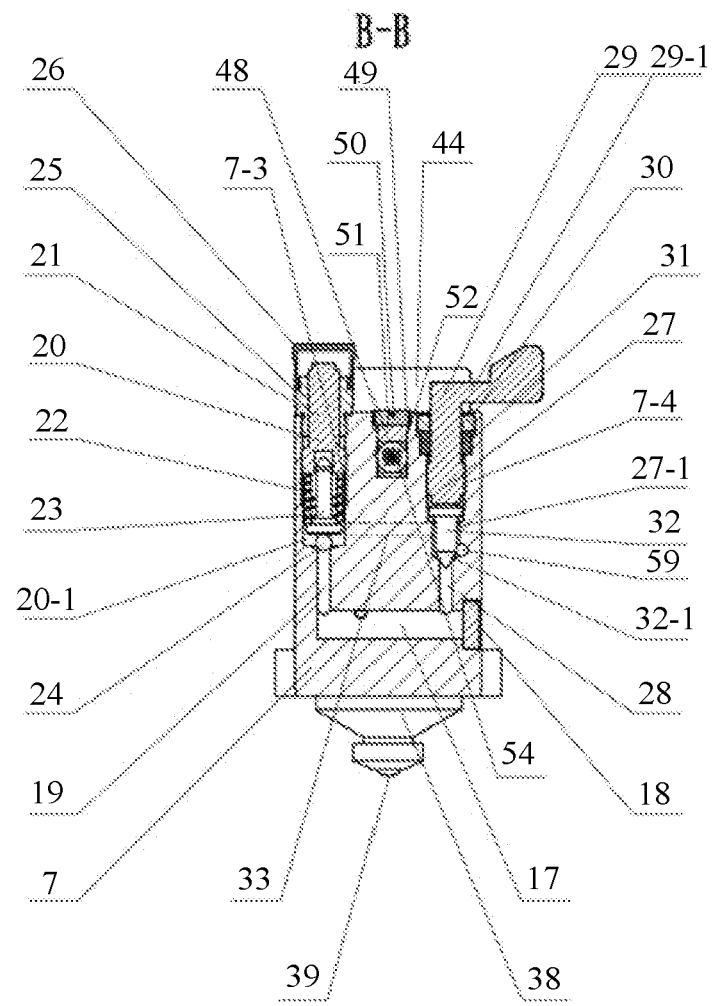
FIG. 6 is an enlarged view of a cross-sectional view taken along line B-B of FIG. 4 after rotating by 90° clockwise.

Mainly, referring to FIG. 6, for ease of manufacture, the second horizontal oil passage 17 is opened at single end toward a side of the hydraulic integrated block 7, and a first screw plug 18 is mounted at the open end of the second horizontal oil passage 17 to stop the hydraulic oil from leaking.

Figure 13:
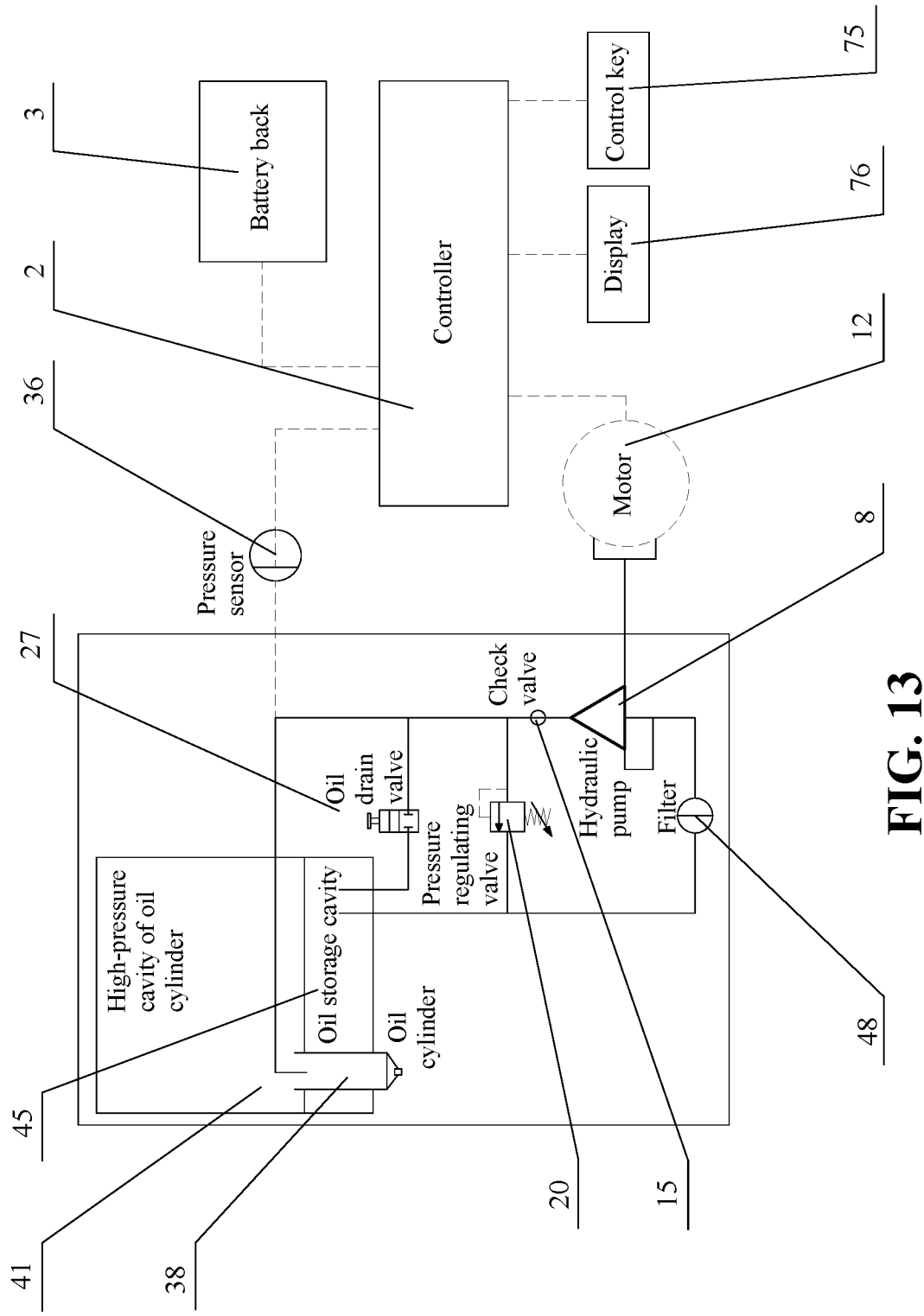
FIG. 13 is a schematic diagram illustrating the principle of a hydraulic system and a circuit system of an electric-hydraulic Brinell hardness testing head of the present invention.

Mainly, referring to FIG. 6 and FIG. 13, a pressure regulating valve 20 is mounted in the pressure regulating hole 7-3 of the hydraulic integrated block 7. A valve ball 24 is mounted at the lower end of the pressure regulating valve 20. The valve ball 24 is located at the upper end of the first vertical oil passage 19. The pressure regulating valve 20 comprises a pressure regulating screw rod 21, a pressure regulating spring 22 and a stepped ejector pin 23, wherein the pressure regulating screw rod 21 is in threaded connection with the pressure regulating hole 7-3, the pressure regulating spring 22 is mounted below the pressure regulating screw rod 21, the stepped ejector pin 23 is mounted below the pressure regulating spring 22. The thinner end of the stepped ejector pin 23 penetrates through the pressure regulating spring 22 to be in contact with a groove at the lower end of the pressure regulating screw rod 21. The end portion of the thinner end of the stepped ejector pin 23 is a conical head, which has the direction guiding effect. The upper end surface of the thicker end of the stepped ejector pin 23 is in contact with the lower end of the pressure regulating spring 22, the bottom surface of the thicker end of the stepped ejector pin 23 is in contact with the valve ball 24. The lower spherical surface of the valve ball 24 is tightly attached to the annular edge of the upper end of the first vertical oil passage 19. A pressure regulating screw plug 25 is connected to the upper end of the external thread of the pressure regulating screw rod 21. The upper end surface of the pressure regulating screw rod 21 is higher than the upper end surface of the pressure regulating screw plug 25. A boss 21-1 is arranged on the upper end surface of the pressure regulating screw rod 21. The boss 21-1 is in the shape of a triangle, preferably, a regular triangle, with three corners thereof are cut off, so that a special tool which matches with the outline of the boss 21-1 is needed to realize the rotation of the pressure regulating screw rod 21, so as to avoid the condition that unauthorized operators change the set value of the test force; the pressure regulating end cover 26 is mounted at the upper end of the pressure regulating screw plug 25; the pressure regulating screw rod 21 can perform vertical movement under the action of internal thread of the pressure regulating hole 7-3 during rotation. The pressure regulating screw rod 21 can apply a preset pressure to the pressure regulating spring 22 at a position in the pressure regulating hole 7-3 after the vertical movement. The pressure regulating spring 22 tightly presses the valve ball 24 with the preset pressure through the stepped ejector pin 23. The valve ball 24 stops the hydraulic oil in the first vertical oil passage 19 from entering the pressure regulating low-pressure cavity 20-1. When the pressure of the hydraulic oil in the first vertical oil passage 19 is greater than the set pressure, the valve ball 24 will rise upwards, then the hydraulic oil in the first vertical oil passage 19 enters the pressure regulating low-pressure cavity 20-1. When the pressure of the hydraulic oil in the first vertical oil passage 19 is smaller than the set pressure, the valve ball 24 will drop down to seal the first vertical oil passage 19, and the pressure of the hydraulic oil in the first vertical oil passage 19 can be set to a corresponding value by adjusting the vertical position of the pressure regulating screw rod 21 in the pressure regulating hole 7-3, so that test force can be set and adjusted.

Mainly, referring to FIG. 6, an oil drain valve 27 is mounted in the oil drain hole 7-4 of the hydraulic integrated block 7. The second vertical oil passage 28 communicates with the oil drain hole 7-4 and is coaxial with the oil drain hole 7-4. The lower end of the second vertical oil passage 28 vertically communicates with the second horizontal oil passage 17 and is parallel to the first vertical oil passage 19; the oil drain valve 27 comprises an oil drain screw rod 29, the upper part of the oil drain screw rod 29 is a sheet-shaped wrench 29-1, the lower part of the oil drain screw rod 29 is a cylinder. An oil drain nut 30 and an oil drain sealing ring 31 sleeve the oil drain screw rod 29. The bottom surface of the oil drain screw rod 29 is in point contact with the convex spherical surface of the upper end of the oil drain ejector pin 32. The lower end of the oil drain ejector pin 32 with a smaller diameter is a cone 32-1. The conical surface of the cone 32-1 is tightly attached to the annular edge of the upper end of the second vertical oil passage 28, and an oil drain cavity 27-1 is formed in a gap between the oil drain ejector pin 32 and the oil drain hole 7-4; the third horizontal oil passage 33 enables the oil drain cavity 27-1 to communicate with the pressure regulating low-pressure cavity 20-1; the sheet-shaped wrench 29-1 is pulled to enable the oil drain screw rod 29 to rotate so as to change the vertical position of the oil drain screw rod 29 in the oil drain hole 7-4. When the oil drain screw rod 29 vertically presses downwards toward the oil drain ejector pin 32, the cone 32-1 of the oil drain ejector pin 32 and the annular edge of the upper end of the second vertical oil passage 28 are in tight contact, so as to prevent the hydraulic oil in the second vertical oil passage 28 from entering the oil drain cavity 27-1. When the oil drain screw rod 29 vertically moves upwards, high-pressure hydraulic oil in the second vertical oil passage 28 can push the oil drain ejector pin 32 to move upwards, so that a gap is formed between the cone 32-1 of the oil drain ejector pin 32 and the annular edge of the upper end of the second vertical oil passage 28, and the hydraulic oil enters the oil drain cavity 27-1 from the second vertical oil passage 28 to release pressure of the hydraulic oil in the second vertical oil passage 28.

Figure 2:
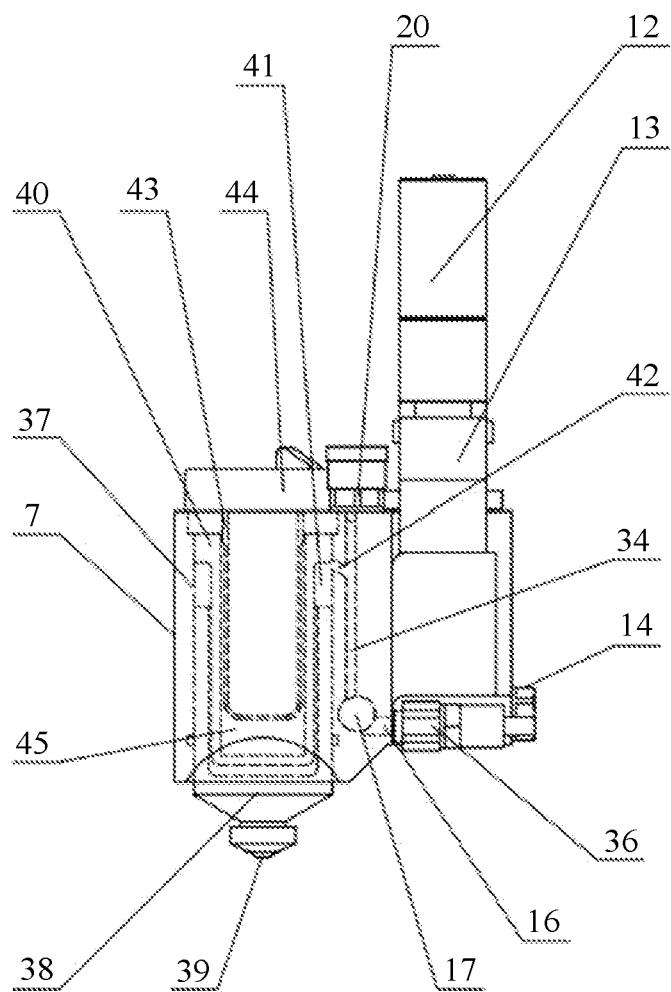
FIG. 2 is a schematic view of the structure for a hidden battery pack, a controller and a motor electrical cover in FIG. 1.
Figure 3:
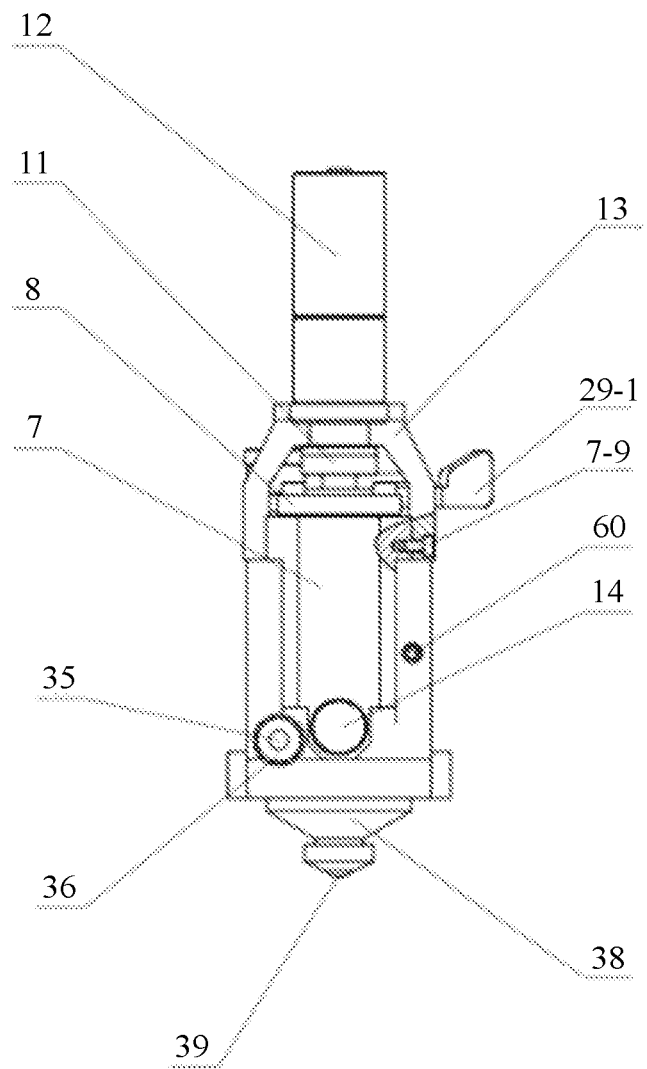
FIG. 3 is a rear view of FIG. 2.

Mainly, referring to FIG. 2 and FIG. 13, the second horizontal oil passage 17 vertically communicates with the third vertical oil passage 34 and the first horizontal oil passage 16, respectively. A pressure sensor 36 is mounted in the pressure sensor mounting hole 35, thereby the hydraulic oil in the second horizontal oil passage 17 is transmitted to the pressure sensor 36 through the first horizontal oil passage 16, and the pressure sensor 36 converts the pressure of the hydraulic oil into electric signal to be transmitted to the controller 2.

Referring to FIG. 2, FIG. 5, FIG. 7 and FIG. 13, the oil cylinder mounting hole 37 is formed in the front part of the hydraulic integrated block 7 and is penetrated in up-and-down direction. The cup-shaped oil cylinder 38 with an outer circle diameter matched with the diameter of the oil cylinder mounting hole 37 is mounted in the oil cylinder mounting hole 37. The oil cylinder 38 can vertically slide in the oil cylinder mounting hole 37. The upper part of the oil cylinder 38 is mounted in the oil cylinder mounting hole 37. The lower part of the oil cylinder 38 extends out of the oil cylinder mounting hole 37. The lower end of the oil cylinder 38 is embedded in the ball indenter 39. An oil storage cup 40 is mounted in the oil cylinder 38. The upper part of the oil storage cup 40 is in interference fit with the oil cylinder mounting hole 37. The vertical position of the oil storage cup 40 in the oil cylinder mounting hole 37 is fixed. The diameter of the lower part of the oil storage cup 40 is smaller than the inner diameter of the circular groove of the oil cylinder 38, and the lower part of the oil storage cup 40 extends downwards into the circular groove of the oil cylinder 38. A closed high-pressure cavity 41 is formed among the inner surface of the oil cylinder mounting hole 37, the upper end surface of the oil cylinder 38, the inner surface of the circular groove and the outer surface of the lower part of the oil storage cup 40; the first inclined oil passage 42 enables the third vertical oil passage 34 to communicate with the high-pressure cavity 41, so that the hydraulic oil in the third vertical oil passage 34 enters the high-pressure cavity 41 through the first inclined oil passage 42, and the high-pressure hydraulic oil can push the oil cylinder 38 to move downwards; a cup-shaped oil bag 43 is mounted in the oil storage cup 40. The lower surface of the annular boss of the upper part of the oil bag 43 is tightly attached to the upper surface of the annular boss of the oil storage cup 40. A cylinder cover 44 is in threaded connection to the opening above the oil cylinder mounting hole 37. The lower end of the cylinder cover 44 is tightly pressed onto the annular boss of the oil bag 43. A closed low-pressure cavity 45 is formed between the cup-shaped outer surface of the oil bag 43 and the circular groove of the oil storage cup 40. The oil bag 43 is made of an elastic rubber material. The increasing of the hydraulic oil in the low-pressure cavity 45 enables the oil bag 43 to be subjected to compression deformation, so that the space volume of the low-pressure cavity 45 can be increased. The reduction of the hydraulic oil in the low-pressure cavity 45 enables the oil bag 43 to be subjected to swelling deformation, so that the space volume of the low-pressure cavity 45 can be reduced.

Referring to FIG. 4, FIG. 5, FIG. 6, FIG. 10 and FIG. 11, the filter mounting hole 49 is located between the oil cylinder mounting hole 37 and the pump body mounting hole 7-1. A filter 48 is mounted in the filter mounting hole 49. A filter cap 50 is mounted at the upper part of the filter mounting hole 49. The filter 48 comprises a filter valve body 51. A radially penetrating rectangular valve core hole 52 and a filter hole 53 that intersects vertically with the valve core hole 52 are arranged on the filter valve body 51. The filter hole 53 is parallel to the fifth horizontal oil passage 47. Openings at two ends of the filter hole 53 are located in the fifth horizontal oil passage 47, and a sheet-shaped filter element 54 is mounted in the rectangular valve core hole 52, so that the hydraulic oil passes through the filter hole 53 and penetrates through micro pores in the sheet-shaped filter element 54 to reach another end of the fifth horizontal oil passage 47, while immunities cannot pass through the micro pore in the filter element 54. A positioning shaft 55 of a cylindrical protrusion is arranged on the lower end surface of the filter valve body 51. A positioning hole 56 with diameter and position which match with those of the positioning shaft 55 is formed on the bottom surface of the filter mounting hole 49. The positioning shaft 55 is located in the positioning hole 56. The position of the filter 48 in the filter mounting hole 49 is determined by the matching of the positioning shaft 55 and the positioning hole 56. An exhaust plane 57 being parallel to a central axis is arranged at the lower part of a cylinder of the filter valve body 51. The distribution of the exhaust plane 57 starts from the lower end surface of the filter valve body 51, and extends upwards to the filter hole 53. An exhaust notch 58 is formed between the exhaust plane 57 and the filter hole 53, thereby during the process of mounting the filter 48 into the filter mounting hole 49 in a direction from top to bottom, the exhaust notch 58 can release air pressure generated between the filter 48 and the filter mounting hole 49.

Mainly, referring to FIG. 5, a seventh horizontal oil passage 40-1 is arranged at the inner diameter of the annular boss of the oil storage cup 40. One end of the seventh horizontal oil passage 40-1 communicates with the low-pressure cavity 45, another end of the seventh horizontal oil passage 40-1 communicates with the fourth horizontal oil passage 46. One end of the fifth horizontal oil passage 47 communicates with the fourth horizontal oil passage 46, and another end of the fifth horizontal oil passage 47 communicates with the oil inlet cavity 9 through the filter hole 53 and the filter element 54.

Figure 4:
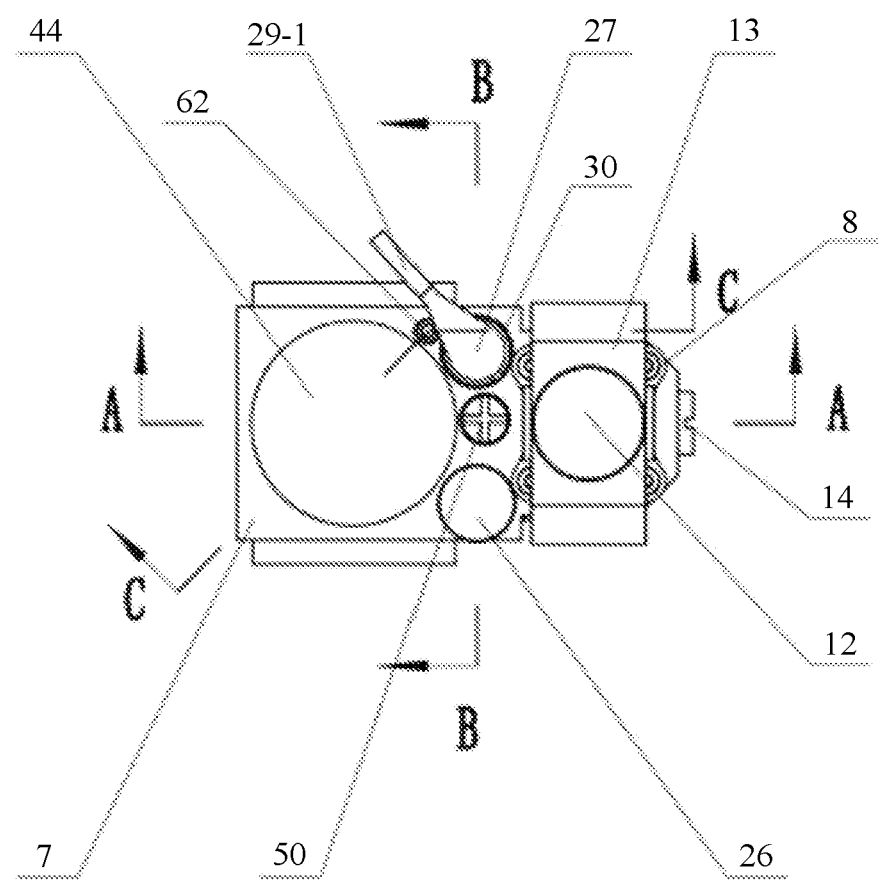
FIG. 4 is a top view of FIG. 2.
Figure 7:
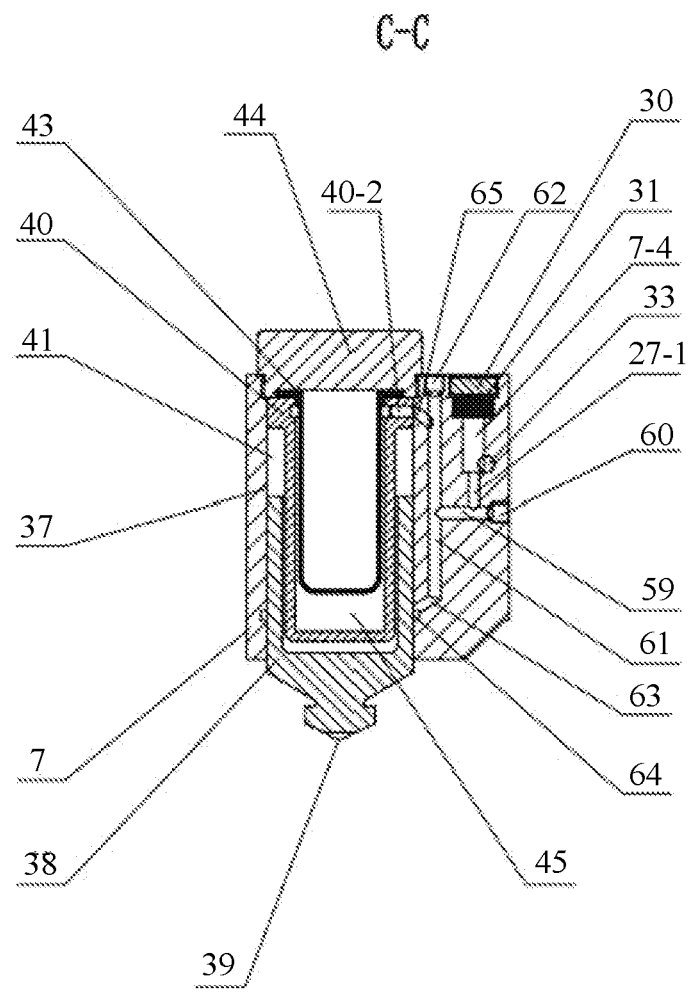
FIG. 7 is an enlarged view of an unfolded plan view of a cross-sectional view taken along line C-C of FIG. 4.
Figure 8:
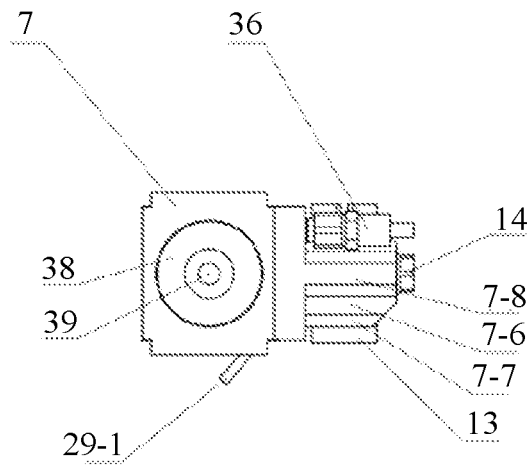
FIG. 8 is an bottom view of FIG. 2.
Figure 9:
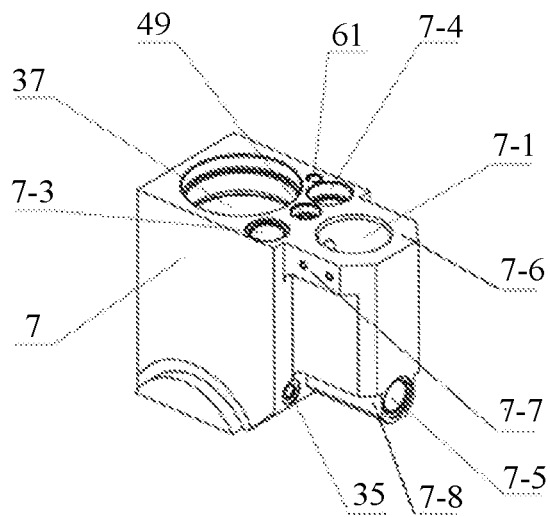
FIG. 9 is a perspective view of a hydraulic integrated block of the present invention.
Figure 10:
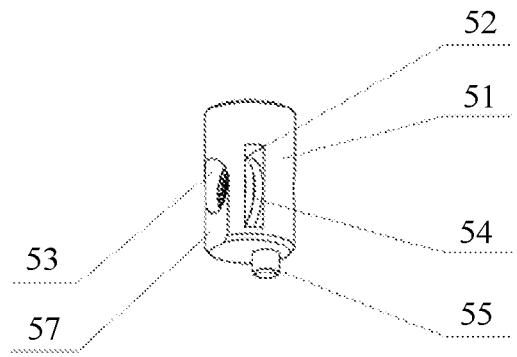
FIG. 10 is a view of a filter of the present invention viewed from the front and bottom side.
Figure 11:
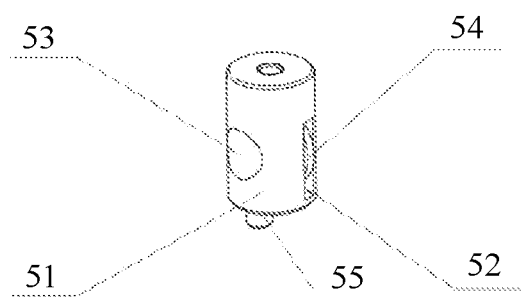
FIG. 11 is a view of the filter of the present invention viewed from the rear and top side.
Figure 12:
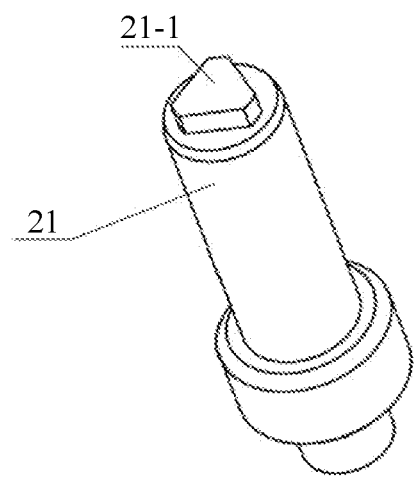
FIG. 12 is a perspective schematic view of a pressure regulating screw rod of the present invention.

Referring to FIG. 4, FIG. 6 and FIG. 7, the middle of the sixth horizontal oil passage 59 communicates with the oil drain cavity 27-1. A first plug 60 is mounted at one end of the sixth horizontal oil passage 59, and another end of the sixth horizontal oil passage 59 communicates with the fourth vertical oil passage 61. A second plug 62 is mounted at the upper end of the fourth vertical oil passage 61. The lower end of the fourth vertical oil passage 61 communicates with the upper end of the second inclined oil passage 63, the lower end of the second inclined oil passage 63 communicates with an annular oil cylinder lubricating groove 64 in the oil cylinder mounting hole 37, and the lower end of the third inclined oil passage 65 communicates with the fourth vertical oil passage 61; and a horizontal oil return passage 40-2 is also arranged at the inner diameter of the annular boss on the oil storage cup 40, the upper end of the third inclined oil passage 65 communicates with the oil return passage 40-2, and another end of the oil return passage 40-2 communicates with the low-pressure cavity 45, so that the hydraulic oil in the pressure regulating low-pressure cavity 20-1 and the oil drain cavity 27-1 flows back into the low-pressure cavity 45 through the sixth horizontal oil passage 59, the fourth vertical oil passage 61, the third inclined oil passage 65, and the oil return passage 40-2.

FIG. 13 is a schematic diagram illustrating the principle of a hydraulic system and a circuit system of an electric-hydraulic Brinell hardness testing head of the present invention.

As shown in FIG. 5 and FIG. 13, the hydraulic system and the circuit system of the electric-hydraulic Brinell hardness testing head both comprise the controller 2, wherein the controller 2 is electrically connected with the motor 12, a display 76, a control key 75, the pressure sensor 36 and the chargeable battery pack 3, respectively. The motor 12 is connected with the electric plunger pump 8, one end of the electric plunger pump 8 is connected with the low-pressure cavity 45 through the filter 48; another end of the electric plunger pump 8 is connected with the high-pressure cavity 41 through the check valve 15, and the high-pressure cavity 41 and the low-pressure cavity 45 are in parallel connection with the pressure regulating valve 20 and the oil drain valve 27 therebetween; the working principle of the circuit system is that the battery pack 3 supplies power to the entire circuit systems through the controller 2, the controller 2 controls the motor 12 to operate, the controller 2 is connected with the pressure sensor 36, the pressure value signal of the hydraulic oil measured by the pressure sensor 36 is transmitted to the controller 2, the controller 2 controls the rotation speed of the electric plunger pump 8, and control of the pressure of the hydraulic oil in the high-pressure cavity 41 at the upper part of the oil cylinder 38 is realized, so that based on the test procedures and technical parameters specified in the national standard GB/T231.1, the ball indenter 39 completes the test process of applying and retaining the test force on the to-be-test workpiece, and produces an accurate Brinell hardness indentation by pressing. The display 76 can be a digital display, and can also be a light-emitting tube, which is used to indicate the working status information and the status information of the battery pack of the electric-hydraulic Brinell hardness testing head. The control key 75 comprises a power key and a measurement key, wherein the operator can control the switching on or off of a power supply by the control key 75, to start or end the measurement and conduct parameter settings and other functions; the working principle of the hydraulic system is that under the control of the controller 2, the motor 12 drives the electric plunger pump 8 to operate, the electric plunger pump 8 sucks the hydraulic oil filtered by the filter 48 from the oil inlet cavity 9, the hydraulic oil is drained into the oil outlet cavity 10 after being pressurized, and the hydraulic oil enters the high-pressure cavity 41 above the oil cylinder 38 through the check valve 15; with the increasing of the oil pressure, the ball indenter 39 is gradually pressed into the surface of the to-be-test workpiece; when the oil pressure reaches a pressure value preset for the pressure regulating valve 20, the valve ball 24 of the pressure regulating valve 20 rises, part of the hydraulic oil is drained into the pressure regulating low-pressure cavity 20-1, and at this time, the controller 2 controls the rotation speed of the electric plunger pump 8, so that the pressure of the hydraulic oil is always maintained to a value when the valve ball 24 is just opened; then, after specified retention time of the test force elapsed, the controller 2 controls the electric plunger pump 8 to stop operating, the display 76 provides a measurement end signal, and at this time, the operator opens the oil drain valve 27, then the pressure of the hydraulic oil in the oil cylinder 38 is released, the operator raises the electric-hydraulic Brinell hardness testing head once again to take out the to-be-test workpiece, the indentation diameter is measured by an optical instrument, the Brinell hardness value can be obtained by lookup table or can be directly shown, and one time of measurement is finished.

Embodiment 2

Figure 14:
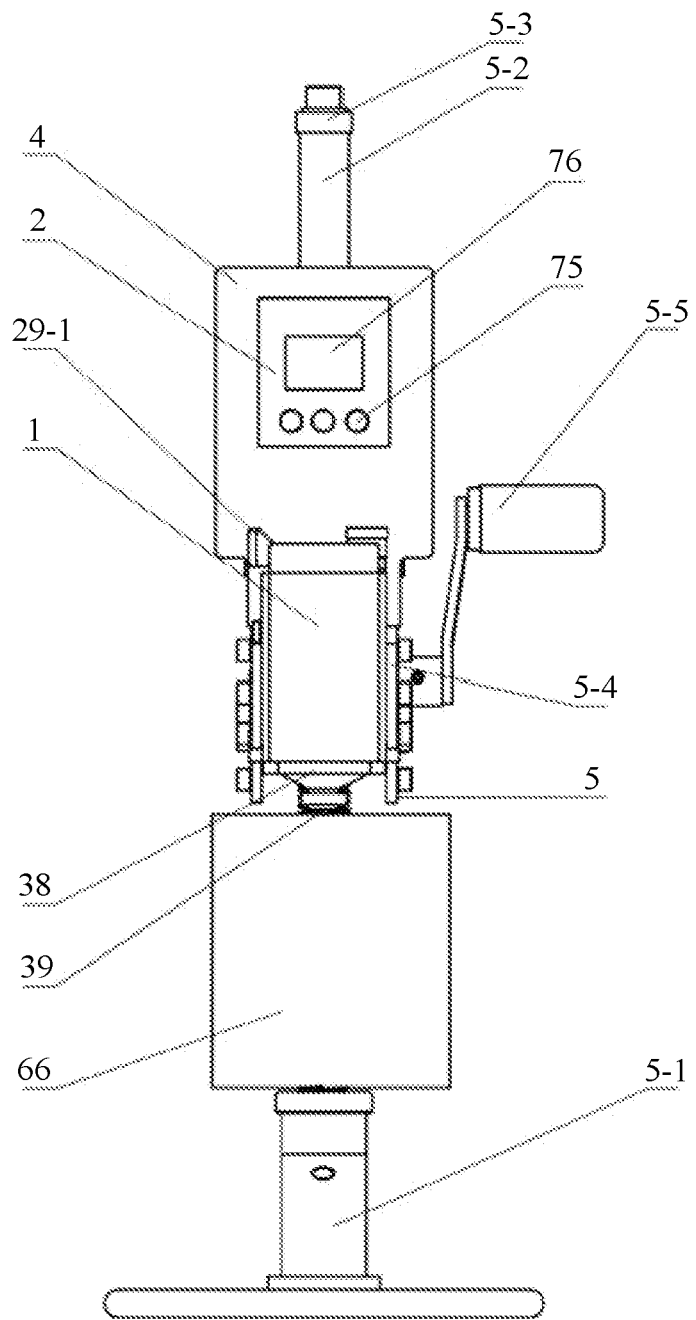
FIG. 14 is a front view of the embodiment 2 of the present invention.
Figure 15:
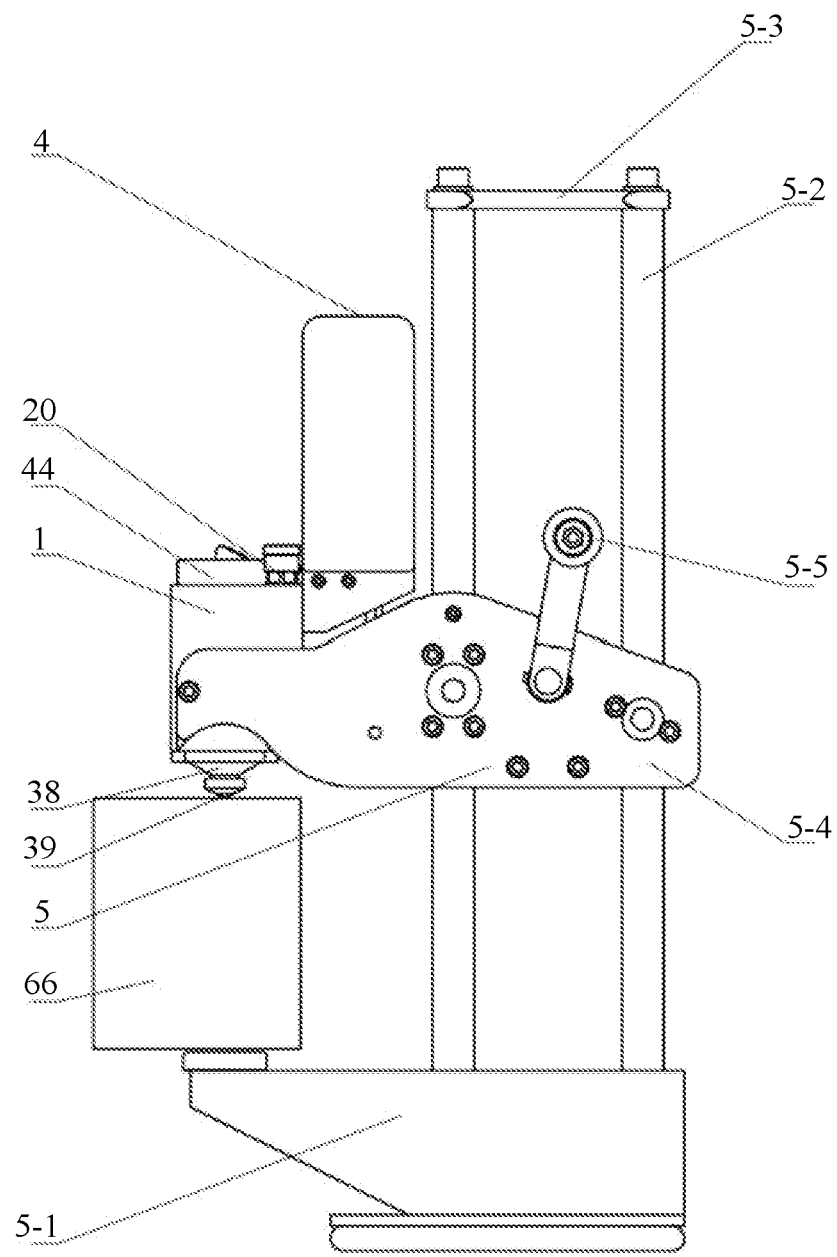
FIG. 15 is a right view of FIG. 14.

As shown in FIG. 14 and FIG. 15, a portable electric-hydraulic Brinell hardness tester of the present invention adopts a technical solution of comprising a lifting bracket 5, wherein the lifting bracket 5 comprises a base 5-1, two parallel lifting screw rods 5-2 are fixedly mounted on the base 5-1, a handle 5-3 is mounted at the upper ends of the lifting screw rods 5-2, a frame 5-4 capable of moving vertically is also mounted on the lifting screw rods 5-2, the electric-hydraulic Brinell hardness testing head 1 of Embodiment 1 is mounted at the left end of the frame 5-4, and a lifting crank handle 5-5 is arranged on the frame 5-4. By shaking the lifting crank handle 5-5, the frame 5-4 can vertically move on the two parallel lifting screw rods 5-2 to be suitable for measurement of first to-be-test workpieces 66 of different sizes. As such, a general portable electric-hydraulic Brinell hardness tester is configured.

For embodiment 2, during test, firstly, the first to-be-test workpiece 66 is placed on the base 5-1, by shaking the lifting crank handle 5-5, the frame 5-4 drives the electric-hydraulic Brinell hardness testing head 1 to move vertically along the lifting screw rods 5-2 to clamp the first to-be-test workpiece 66, the sheet-shaped wrench 29-1 of the oil drain screw rod 29 is rotated, the oil drain 27 is closed, a measurement key in the control key 75 is pressed, then the instrument starts to operate. The controller 2 activates the motor 12 to drive the electric plunger pump 8 to operate, the electric plunger pump 8 sucks the hydraulic oil from the oil inlet cavity 9 during operating, the hydraulic oil is drained into the oil outlet cavity 10 after being pressurized, and the hydraulic oil enters the second horizontal oil passage 17 through the check valve 15 and then enters the high-pressure cavity 41 through the third vertical oil passage 34 and the first inclined oil passage 42. With continuous operation of the electric plunger pump 8, the pressure of the hydraulic oil in the high-pressure cavity 41 is continuously increased to push the oil cylinder 38 to move downwards, then the ball indenter 39 is gradually pressed into the first to-be-test workpieces 66. During the pressing process, the pressure signal of the hydraulic oil, measured by the pressure sensor 36, is transmitted to the controller 2. When the pressure of the hydraulic oil reaches the set value, the valve ball 24 of the pressure regulating valve 20 rises, then the hydraulic oil starts to flow into the pressure regulating low-pressure cavity 20-1. Because the controller 2 continuously controls the rotation speed of the electric plunger pump 8, the valve ball 24 is always in the just-raised state, and the test force is remained at the set value. At the same time, when the pressure value measured by the pressure sensor 36 reaches the set value, the controller 2 starts timing. When the time of timing reaches the specified time, namely 15 s, the controller 2 controls the motor 12 and the electric plunger pump 8 to stop operating; and at this time, the operator pulls the sheet-shaped wrench 29-1 of the oil drain screw rod 29, the oil drain valve 27 is opened, then the hydraulic oil in the high-pressure cavity 41 flows into the oil drain cavity 27-1, as mentioned above, the hydraulic oil in the pressure regulating low-pressure cavity 20-1 and the hydraulic oil in the oil drain cavity 27-1 flow back to the low-pressure cavity 45 through the oil passages, the test force on the ball indenter 39 is released, then, the operator shakes the lifting crank handle 5-5 to raise the electric-hydraulic Brinell hardness testing head 1, and takes out the first to-be-test workpiece 66, a Brinell indentation will be left on the first to-be-test workpiece 66. The indentation diameter is measured by an optical instrument, the Brinell hardness value is directly displayed on the optical instrument or obtained by lookup table, and one time of measurement is finished.

Embodiment 3

Figure 16:
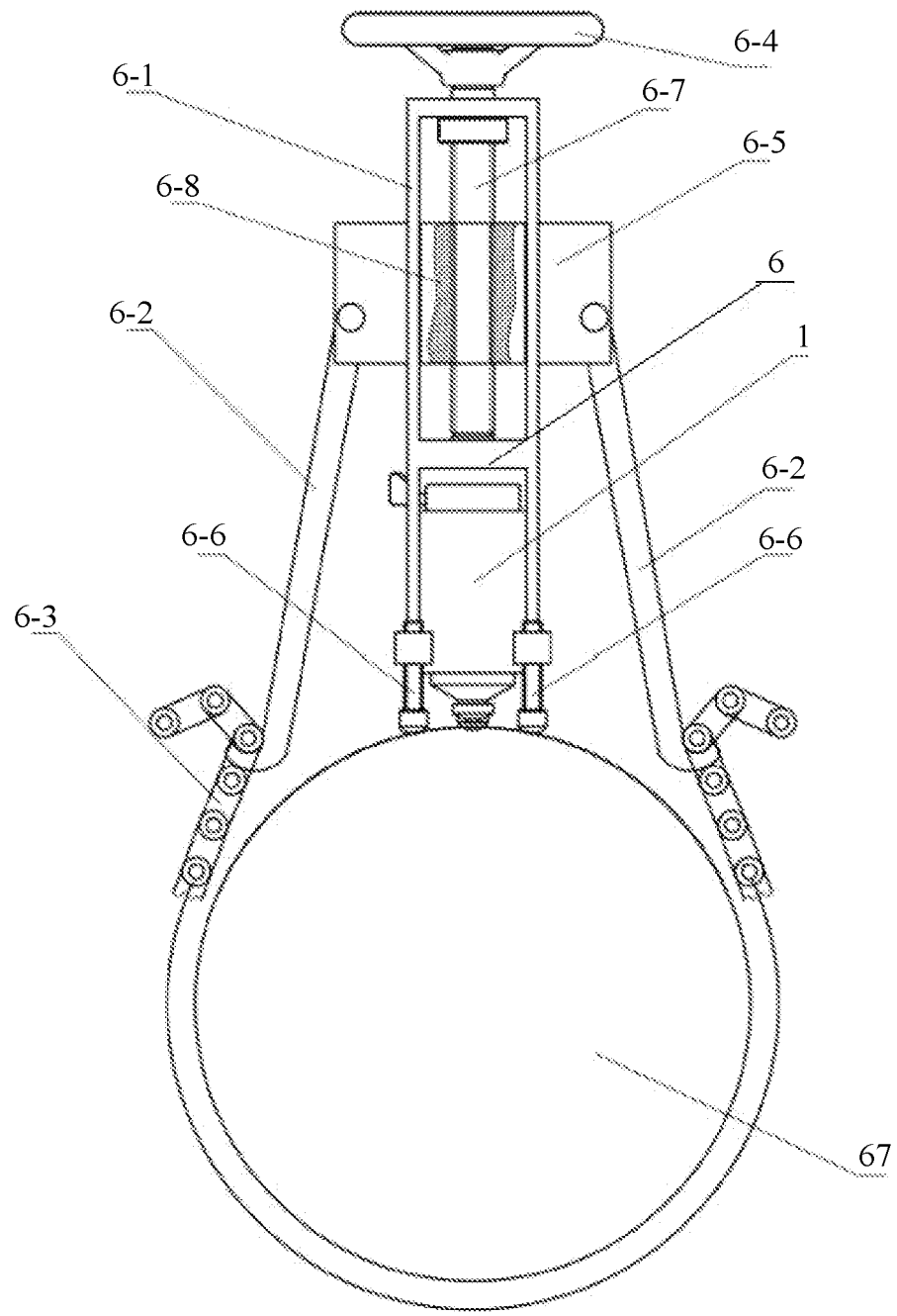
FIG. 16 is a front view of the embodiment 3 of the present invention.
Figure 17:
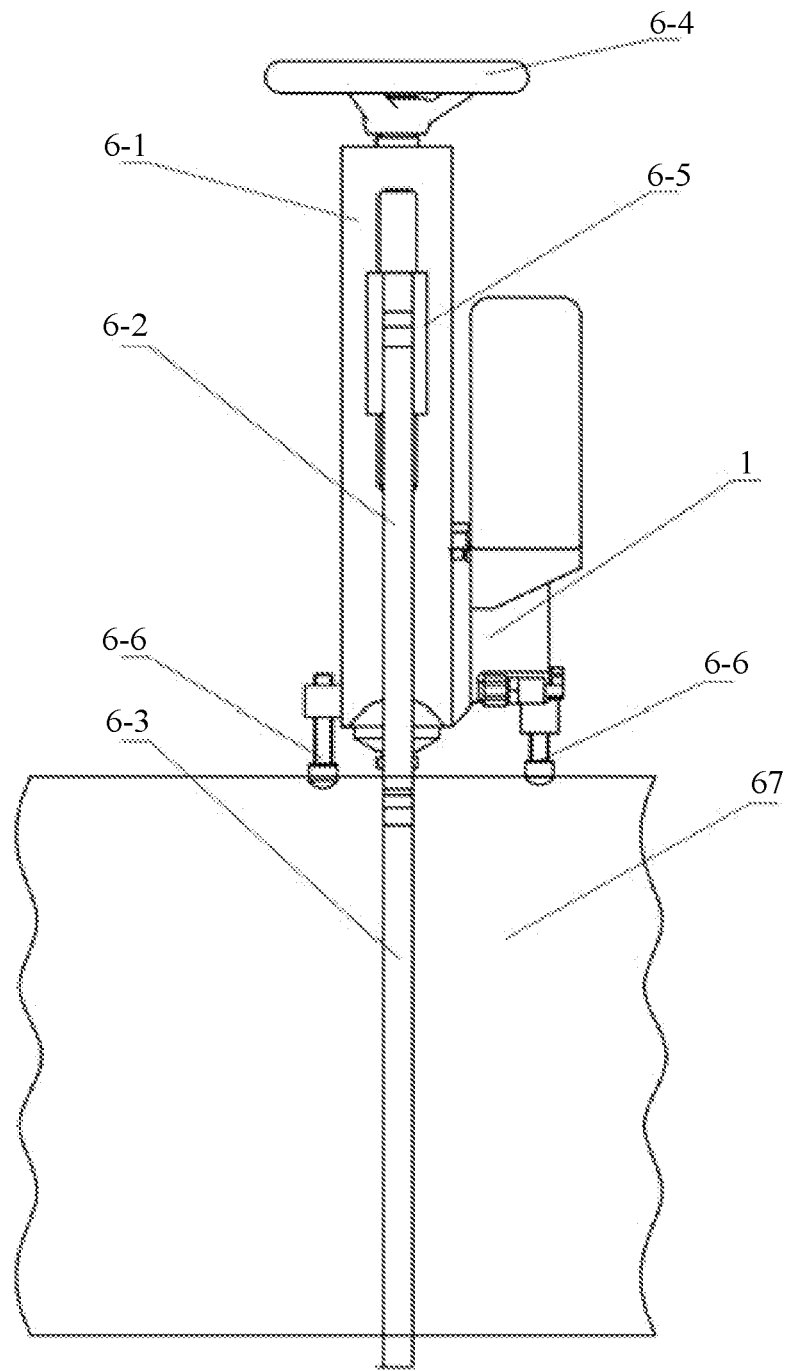
FIG. 17 is a right view of FIG. 16.

As shown in FIG. 16 and FIG. 17, a portable electric-hydraulic Brinell hardness tester of the present invention adopts a technical solution of comprising a chain bracket 6, wherein the chain bracket 6 comprises a bracket body 6-1, a handwheel 6-4 is mounted at the upper end of the bracket body 6-1, the lower end of the handwheel 6-4 is in threaded connection with a nut 6-8 mounted on a lifting connecting plate 6-5, through a handwheel screw rod 6-7, hooks 6-2 are respectively connected to two sides of the lifting connecting plate 6-5, support legs 6-6 are mounted at the lower end of the bracket body 6-1, the electric-hydraulic Brinell hardness testing head 1 of Embodiment 1 is mounted at the lower part of the bracket body 6-1, and chains 6-3 are connected to the hooks 6-2. As such, a chain-type portable electric-hydraulic Brinell hardness tester special for measuring a steel pipe, a steel bar and other cylindrical workpieces is configured.

For embodiment 3, during test, the operator makes the chains 6-3 be around a cylindrical to-be-test workpiece 67 to be hung onto the two hooks 6-2, and adjusts the positions of the support legs 6-6, so that the ball indenter 39 is vertical to the test surface of the cylindrical to-be-test workpieces 67. The handwheel 6-4 is rotated counterclockwise, and the handwheel 6-4 drives the handwheel screw rod 6-7 to move upwards in the nut 6-8 mounted on the lifting connecting plate 6-5, so that the hooks 6-2 are driven to move upwards, the chains 6-3 are tightened, then the ball indenter 39 is tightly pressed onto the surface of the cylindrical to-be-test workpiece 67. The sheet-shaped wrench 29-1 of the oil drain screw rod 29 is rotated, the oil drain valve 27 is closed, a measurement key in the control key 75 is pressed, then the instrument starts to operate. The controller 2 activates the motor 12 to drive the electric plunger pump 8 to operate, the electric plunger pump 8 sucks the hydraulic oil from the oil inlet cavity 9 during operating, the hydraulic oil is drained into the oil outlet cavity 10 after being pressurized, and the hydraulic oil enters the second horizontal oil passage 17 through the check valve 15 and then enters the high-pressure cavity 41 through the third vertical oil passage 34 and the first inclined oil passage 42. With continuous operation of the electric plunger pump 8, the pressure of the hydraulic oil in the high-pressure cavity 41 is continuously increased to push the oil cylinder 38 to move downwards, then the ball indenter 39 is gradually pressed into the cylindrical to-be-test workpiece 67. During the pressing process, the pressure signal of the hydraulic oil, measured by the pressure sensor 36, is transmitted to the controller 2. When the pressure of the hydraulic oil reaches the set value, the valve ball 24 of the pressure regulating valve 20 rises, then the hydraulic oil starts to flow into the pressure regulating low-pressure cavity 20-1. Because the controller 2 continuously controls the rotation speed of the electric plunger pump 8, the valve ball 24 is always in the just-raised state, and the test force is remained at the set value. At the same time, when the pressure value measured by the pressure sensor 36 reaches the set value, the controller 2 starts timing. When the time of timing reaches the specified time, namely 15 s, the controller 2 controls the motor 12 and the electric plunger pump 8 to stop operating, and the display provides a measurement end signal; and at this time, the operator pulls the sheet-shaped wrench 29-1 of the oil drain screw rod 29, the oil drain valve 27 is opened, then the hydraulic oil in the high-pressure cavity 41 flows into the oil drain cavity 27-1, as mentioned above, the hydraulic oil in the pressure regulating low-pressure cavity 20-1 and the hydraulic oil in the oil drain cavity 27-1 flow back to the low-pressure cavity 45 through the oil passages, the test force on the ball indenter 39 is released, and then, the handwheel 6-4 is rotated clockwise, so that the hooks 6-2 move downwards, the chains 6-3 are loosened, the chains 6-3 are taken down, the chain bracket 6 is removed, a Brinell indentation will be left on the cylindrical to-be-test workpiece 67. The indentation diameter is measured by the optical instrument, and the Brinell hardness value is directly displayed on the optical instrument or obtained by lookup table.

Embodiment 4

Figure 18:
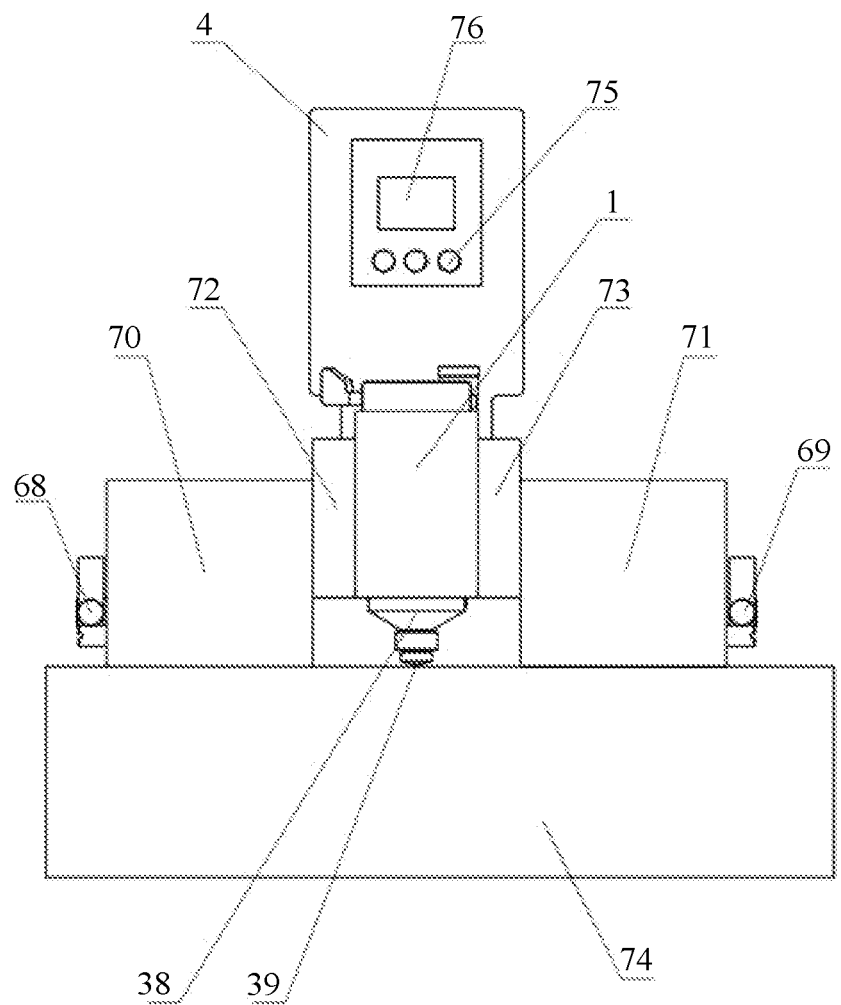
FIG. 18 is a front view of the embodiment 4 of the present invention.
Figure 19:
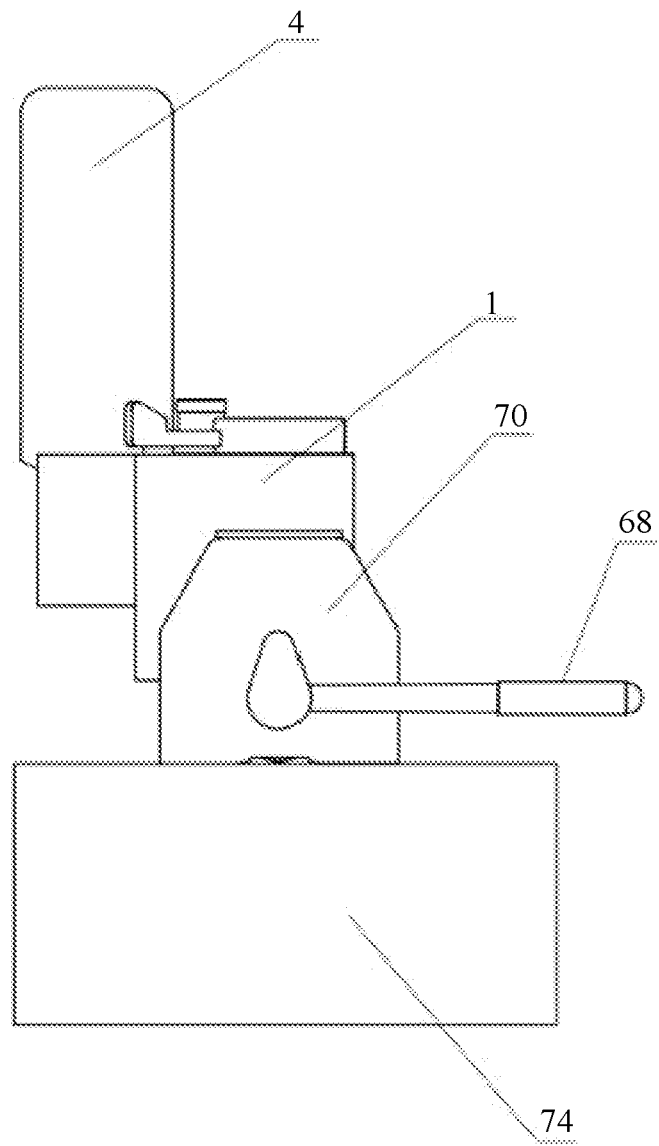
FIG. 19 is a left view of FIG. 18.
In the drawings:
1. electric-hydraulic Brinell hardness testing head; 2. controller; 3. battery pack; 4. motor electrical cover;
5. lifting bracket; 5-1. base; 5-2. lifting screw rod; 5-3. handle; 5-4. frame; 5-5. lifting crank handle;
6. chain bracket; 6-1. bracket body; 6-2. hook; 6-3. chain; 6-4. handwheel; 6-5. lifting connecting plate; 6-6. support foot; 6-7. handwheel screw rod; 6-8. nut;
7. hydraulic integrated block; 7-1. pump body mounting hole; 7-2. oil outlet;
7-3. pressure regulating hole; 7-4. oil drain hole; 7-5. check valve mounting hole;
7-6. rear protrusion; 7-7. mounting boss; 7-8. lower protrusion; 7-9. connecting screw;
8. electric plunger pump; 8-1. pump body; 8-2. pump shaft;
9. oil inlet cavity; 10. oil outlet cavity; 11. shaft coupler; 12. motor; 12-1. motor shaft;
13. motor bracket; 14. cartridge valve seat; 14-1. L-shaped oil passage;
15. check valve; 16. first horizontal oil passage; 17. second horizontal oil passage;
18. first screw plug; 19. first vertical oil passage; 20. pressure regulating valve; 20-1. pressure regulating low-pressure cavity;
21. pressure regulating screw rod; 21-1. boss; 22. pressure regulating spring; 23. stepped ejector pin;
24. valve ball; 25. pressure regulating screw plug; 26. pressure regulating end cover; 27. oil drain valve; 27-1. oil drain cavity;
28. second vertical oil passage; 29. oil drain screw rod; 29-1. sheet-shaped wrench; 30. oil drain nut;
31. oil drain sealing ring; 32. oil drain ejector pin; 32-1. cone;
33. third horizontal oil passage; 34. third vertical oil passage; 35. pressure sensor mounting hole;
36. pressure sensor; 37. oil cylinder mounting hole; 38. oil cylinder; 39. ball indenter;
40. oil storage cup; 40-1. seventh horizontal oil passage; 40-2. oil return passage;
41. high-pressure cavity; 42. first inclined oil passage; 43. oil bag; 44. cylinder cover; 45. low-pressure cavity;
46. fourth horizontal oil passage; 47. fifth horizontal oil passage; 48. filter; 49. filter mounting hole;
50. filter cap; 51. filter valve body; 52. rectangular valve core hole; 53. filter hole;
54. filter element; 55. positioning shaft; 56. positioning hole; 57. exhaust plane; 58. exhaust notch;
59. sixth horizontal oil passage; 60. first plug; 61. fourth vertical oil passage; 62. second plug;
63. second inclined oil passage; 64. oil cylinder lubricating groove; 65. third inclined oil passage;
66. first to-be-test workpiece; 67. cylindrical to-be-test workpiece; 68. left magnetic switch handle;
69. right magnetic switch handle; 70. left magnetic sucking disc; 71. right magnetic sucking disc;
72. left connecting plate; 73. right connecting plate; 74. third to-be-test workpiece;
75. control key; 76. display.

As shown in FIG. 18 and FIG. 19, the portable electric-hydraulic Brinell hardness tester of the present invention adopts a technical solution of comprising a left connecting plate 72 and a right connecting plate 73, wherein a left magnetic sucking disc 70 is connected to the left connecting plate 72, a right magnetic sucking disc 71 is connected to the right connecting plate 73, a left magnetic switch handle 68 is mounted on the left side of the left magnetic sucking disc 70, a right magnetic switch handle 69 is mounted on the right side of the right magnetic sucking disc 71, the lower surfaces of the left magnetic sucking disc 70 and the right magnetic sucking disc 71 are magnetic sucking surfaces, the left magnetic sucking disc and the right magnetic sucking disc are located on the same plane, and the electric-hydraulic Brinell hardness testing head 1 of Embodiment 1 is mounted between the left connecting plate 72 and the right connecting plate 73, so as to configure a magnetic portable electric-hydraulic Brinell hardness tester.

For the embodiment 4, during test, the left magnetic switch handle 68 and the right magnetic switch handle 69 are simultaneously rotated to "On", the left magnetic sucking disc 70 and the right magnetic sucking disc 71 are firmly adhered to a third to-be-test workpiece 74 through magnetic attraction force. The sheet-shaped wrench 29-1 of the oil drain screw rod 29 is rotated, the oil drain valve 27 is closed, a measurement key in the control key 75 is pressed, then the instrument starts to operate. The controller 2 activates the motor 12 to drive the electric plunger pump 8 to operate, the electric plunger pump 8 sucks the hydraulic oil from the oil inlet cavity 9 during operating, the hydraulic oil is drained into the oil outlet cavity 10 after being pressurized, and the hydraulic oil enters the second horizontal oil passage 17 through the check valve 15 and then enters the high-pressure cavity 41 through the third vertical oil passage 34 and the first inclined oil passage 42. With continuous operation of the electric plunger pump 8, the pressure of the hydraulic oil in the high-pressure cavity 41 is continuously increased to push the oil cylinder 38 to move downwards, then the ball indenter 39 is gradually pressed into the third to-be-test workpiece 74. During the pressing process, the pressure signal of the hydraulic oil, measured by the pressure sensor 36, is transmitted to the controller 2. When the pressure of the hydraulic oil reaches the set value, the valve ball 24 of the pressure regulating valve 20 rises, then the hydraulic oil starts to flow into the pressure regulating low-pressure cavity 20-1. Because the controller 2 continuously controls the rotation speed of the electric plunger pump 8, the valve ball 24 is always in the just-raised state, and the test force is remained at the set value. At the same time, when the pressure value measured by the pressure sensor 36 reaches the set value, the controller 2 starts timing. When the time of timing reaches the specified time, namely 15 s, the controller 2 controls the motor 12 and the electric plunger pump 8 to stop operating, and the display provides a measurement end signal; at this time, the operator pulls the sheet-shaped wrench 29-1 of the oil drain screw rod 29, the oil drain valve 27 is opened, then the hydraulic oil in the high-pressure cavity 41 flows into the oil drain cavity 27-1, as mentioned above, the hydraulic oil in the pressure regulating low-pressure cavity 20-1 and the hydraulic oil in the oil drain cavity 27-1 flow back to the low-pressure cavity 45 through the oil passages, and the test force on the ball indenter 39 is released; and at this time, the operator uses a pry bar to pry the oil cylinder 38, the oil cylinder 38 is pushed upwards to the initial measurement position, besides, the left magnetic switch handle 68 and the right magnetic switch handle 69 are simultaneously rotated reversely to "Off", the left magnetic sucking disc 70 and the right magnetic sucking disc 71 are disengaged from the third to-be-test workpiece 74, the hardness tester is removed, a Brinell indentation will be left on the third to-be-test workpiece 74. The indentation diameter is measured by the optical instrument, and the Brinell hardness value is directly displayed on the optical instrument or obtained by lookup table.

What is claimed is:

1. An electric-hydraulic Brinell hardness testing head, comprising a check valve, a pressure regulating valve, an oil drain valve, an oil cylinder, a ball indenter, and a hydraulic integrated block, wherein a controller, a battery pack, and a motor are mounted on the hydraulic integrated block; the controller is electrically connected with the motor and the battery pack, respectively; an electric plunger pump body mounting hole and a check valve mounting hole are formed on the hydraulic integrated block, an electric plunger pump is mounted in the electric plunger pump body mounting hole, a cartridge valve seat is mounted in the check valve mounting hole, the check valve is mounted in the cartridge valve seat, one end of the electric plunger pump communicates with a low-pressure cavity, another end of the electric plunger pump communicates with a high-pressure cavity through the check valve, and the motor is connected with the electric plunger pump;

wherein a first horizontal oil passage, a second horizontal oil passage, a third horizontal oil passage, a fourth horizontal oil passage, a fifth horizontal oil passage, a sixth horizontal oil passage, a seventh horizontal oil passage, a first vertical oil passage, a second vertical oil passage, a third vertical oil passage, a fourth vertical oil passage, a first inclined oil passage, a second inclined oil passage and a third inclined oil passage are arranged in the hydraulic integrated block; wherein an oil outlet is formed at a bottom of the electric plunger pump body mounting hole, an L-shaped oil passage is arranged in the cartridge valve seat, two ends of the L-shaped oil passage respectively communicate with the oil outlet and the check valve, one end of the first horizontal oil passage communicates with the check valve, another end of the first horizontal oil passage communicates with the second horizontal oil passage, the second horizontal oil passage communicates with the third vertical oil passage, the third vertical oil passage communicates with the high-pressure cavity through the first inclined oil passage, the low-pressure cavity communicates with one end of the seventh horizontal oil passage, another end of the seventh horizontal oil passage communicates with the fourth horizontal oil passage, the fourth horizontal oil passage communicates with the fifth horizontal oil passage, and another end of the fifth horizontal oil passage communicates with an oil inlet cavity.

2. The electric-hydraulic Brinell hardness testing head of claim 1, wherein a rear protrusion is arranged at an rear part of the hydraulic integrated block, mounting bosses are arranged on left and right sides of an upper part of the rear protrusion, a motor bracket and a motor electrical cover are mounted on the mounting bosses, and the motor is mounted at an upper end of the motor bracket; and the controller and the battery pack are mounted on the motor electrical cover, a lower protrusion is arranged at a lower part of the rear protrusion of the hydraulic integrated block, the check valve mounting hole is formed on a rear side of the lower protrusion, and the electric plunger pump body mounting hole is formed on the rear protrusion of the hydraulic integrated block.

3. The electric-hydraulic Brinell hardness testing head of claim 1, wherein a valve ball is mounted at an lower end of the pressure regulating valve; and the second vertical oil passage communicates with an oil drain hole, an lower end of the second vertical oil passage communicates with the second horizontal oil passage and is parallel to the first vertical oil passage, the second horizontal oil passage communicates with the third vertical oil passage and the first horizontal oil passage, respectively, an oil storage cup is mounted in the oil cylinder, a diameter of a lower part of the oil storage cup is smaller than an inner diameter of a circular groove of the oil cylinder, the oil storage cup extends downwards into the circular groove of the oil cylinder, the high-pressure cavity is formed to be closed among an inner surface of an oil cylinder mounting hole, an upper end surface of the oil cylinder, an inner surface of the circular groove and an outer surface of the lower part of the oil storage cup, a cup-shaped oil bag is mounted in the oil storage cup, the low-pressure cavity is formed to be closed between a cup-shaped outer surface of the oil bag and a circular groove of the oil storage cup, and the seventh horizontal oil passage is arranged at an inner diameter of an annular boss of the oil storage cup.

4. The electric-hydraulic Brinell hardness testing head of claim 3, wherein the pressure regulating valve comprises a pressure regulating screw rod, a pressure regulating spring and a stepped ejector pin, wherein the pressure regulating screw rod is in threaded connection with a pressure regulating hole, the pressure regulating spring is mounted below the pressure regulating screw rod, the stepped ejector pin is mounted below the pressure regulating spring, one end of the stepped ejector pin penetrates through the pressure regulating spring to be in contact with a groove at a lower end of the pressure regulating screw rod, an upper end surface of another end of the stepped ejector pin is in contact with an lower end of the pressure regulating spring, a bottom surface of a thicker end of the stepped ejector pin is in contact with the valve ball, a lower spherical surface of the valve ball is tightly attached to an annular edge of an upper end of the first vertical oil passage, and a pressure regulating screw plug is connected to an upper end of an external thread of the pressure regulating screw rod, an upper end surface of the pressure regulating screw rod is higher than an upper end surface of the pressure regulating screw plug, and a boss is arranged on the upper end surface of the pressure regulating screw rod.

5. The electric-hydraulic Brinell hardness testing head of claim 3, wherein the oil drain valve comprises an oil drain screw rod, wherein an upper part of the oil drain screw rod is a sheet-shaped wrench, a lower part of the oil drain screw rod is a cylinder, an oil drain nut and an oil drain sealing ring sleeve the oil drain screw rod, a bottom surface of the oil drain screw rod is in point contact with a convex spherical surface of an upper end of an oil drain ejector pin, a lower end of the oil drain ejector pin with a smaller diameter is a cone, a conical surface of the cone is tightly attached to an annular edge of an upper end of the second vertical oil passage, and an oil drain cavity is formed in a gap between the oil drain ejector pin and the oil drain hole, the third horizontal oil passage enables the oil drain cavity to communicate with a pressure regulating low-pressure cavity, and a middle of the sixth horizontal oil passage communicates with the oil drain cavity, a first plug is mounted at one end of the sixth horizontal oil passage, and another end of the sixth horizontal oil passage communicates with the fourth vertical oil passage, a second plug is mounted at an upper end of the fourth vertical oil passage, an lower end of the fourth vertical oil passage communicates with an upper end of the second inclined oil passage, an lower end of the second inclined oil passage communicates with an annular oil cylinder lubricating groove in the oil cylinder mounting hole, and an lower end of the third inclined oil passage communicates with the fourth vertical oil passage; and a horizontal oil return passage is arranged at the inner diameter of the annular boss on the oil storage cup, an upper end of the third inclined oil passage communicates with the oil return passage, and another end of the oil return passage communicates with the low-pressure cavity.

6. The electric-hydraulic Brinell hardness testing head of claim 1, wherein a filter mounting hole is formed on the hydraulic integrated block, a filter is mounted in the filter mounting hole, the filter comprises a filter valve body, a radially penetrating rectangular valve core hole and a filter hole that intersects vertically with the valve core hole are arranged on the filter valve body, openings at two ends of the filter hole are located in the fifth horizontal oil passage, a sheet-shaped filter element is mounted in the rectangular valve core hole, a positioning shaft being a cylindrical protrusion is arranged at a lower end surface of the filter valve body, a positioning hole matching with the positioning shaft is formed on a bottom surface of the filter mounting hole, an exhaust plane being parallel to a central axis is arranged at an lower part of a cylinder of the filter valve body, and an exhaust notch is formed between the exhaust plane and the filter hole.

7. A portable electric-hydraulic Brinell hardness tester, comprising the electric-hydraulic Brinell hardness testing head of claim 1 and a lifting bracket, wherein the lifting bracket comprises a base, two parallel lifting screw rods are fixedly mounted on the base, a handle is mounted at upper ends of the lifting screw rods, a frame capable of moving vertically is mounted on the lifting screw rods, and a lifting crank handle is arranged on the frame, wherein the electric-hydraulic Brinell hardness testing head is mounted at a left end of the frame.

8. A portable electric-hydraulic Brinell hardness tester, comprising the electric-hydraulic Brinell hardness testing head of claim 1 and a chain bracket, wherein the chain bracket comprises a bracket body, a handwheel is mounted at an upper end of the bracket body, a lower end of the handwheel is in threaded connection with a nut mounted on a lifting connecting plate through a handwheel screw rod, hooks are respectively connected to two sides of the lifting connecting plate, chains are connected to the hooks, support legs are mounted at a lower end of the bracket body, wherein the electric-hydraulic Brinell hardness testing head is mounted at a lower part of the bracket body.

9. A portable electric-hydraulic Brinell hardness tester, comprising the electric-hydraulic Brinell hardness testing head of claim 1 and a left connecting plate and a right connecting plate, wherein a left magnetic sucking disc is connected to the left connecting plate, a right magnetic sucking disc is connected to the right connecting plate, a left magnetic switch handle is mounted on a left side of the left magnetic sucking disc, a right magnetic switch handle is mounted on a right side of the right magnetic sucking disc, lower surfaces of the left magnetic sucking disc and the right magnetic sucking disc are magnetic sucking surfaces, the left magnetic sucking disc and the right magnetic sucking disc are located on a same plane, wherein the electric-hydraulic Brinell hardness testing head is mounted between the left connecting plate and the right connecting plate.

10. A portable electric-hydraulic Brinell hardness tester, comprising the electric-hydraulic Brinell hardness testing head of claim 2 and a lifting bracket, wherein the lifting bracket comprises a base, two parallel lifting screw rods are fixedly mounted on the base, a handle is mounted at upper ends of the lifting screw rods, a frame capable of moving vertically is mounted on the lifting screw rods, and a lifting crank handle is arranged on the frame, wherein the electric-hydraulic Brinell hardness testing head is mounted at a left end of the frame.

11. A portable electric-hydraulic Brinell hardness tester, comprising the electric-hydraulic Brinell hardness testing head of claim 2 and a chain bracket, wherein the chain bracket comprises a bracket body, a handwheel is mounted at an upper end of the bracket body, a lower end of the handwheel is in threaded connection with a nut mounted on a lifting connecting plate through a handwheel screw rod, hooks are respectively connected to two sides of the lifting connecting plate, chains are connected to the hooks, support legs are mounted at a lower end of the bracket body, wherein the electric-hydraulic Brinell hardness testing head is mounted at a lower part of the bracket body.

12. A portable electric-hydraulic Brinell hardness tester, comprising the electric-hydraulic Brinell hardness testing head of claim 2 and a left connecting plate and a right connecting plate, wherein a left magnetic sucking disc is connected to the left connecting plate, a right magnetic sucking disc is connected to the right connecting plate, a left magnetic switch handle is mounted on a left side of the left magnetic sucking disc, a right magnetic switch handle is mounted on a right side of the right magnetic sucking disc, lower surfaces of the left magnetic sucking disc and the right magnetic sucking disc are magnetic sucking surfaces, the left magnetic sucking disc and the right magnetic sucking disc are located on a same plane, wherein the electric-hydraulic Brinell hardness testing head is mounted between the left connecting plate and the right connecting plate.

* * * * *